(12) United States Patent
Hayes et al.

(10) Patent No.: US 8,178,206 B2
(45) Date of Patent: May 15, 2012

(54) SOLAR CONTROL LAMINATES

(75) Inventors: Richard Allan Hayes, Beaumont, TX (US); Richard A. Fugiel, Long Grove, IL (US); Thomas R. Phillips, Vienna, WV (US); Lee A. Silverman, Newark, DE (US); Jason S. Wall, Middletown, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/644,230

(22) Filed: Dec. 22, 2009

(65) Prior Publication Data

US 2010/0096604 A1 Apr. 22, 2010

Related U.S. Application Data

(63) Continuation-in-part of application No. 11/977,817, filed on Oct. 26, 2007, now abandoned, which is a continuation-in-part of application No. 11/646,649, filed on Dec. 28, 2006, now abandoned.

(60) Provisional application No. 60/755,487, filed on Jan. 3, 2006, provisional application No. 60/755,492, filed on Dec. 30, 2005.

(51) Int. Cl.
*B32B 27/30* (2006.01)
*F21V 9/06* (2006.01)
*B32B 17/10* (2006.01)

(52) U.S. Cl. ........ 428/437; 359/355; 359/356; 359/361; 428/436; 428/441; 428/442; 523/135

(58) Field of Classification Search ............... 523/135; 359/355, 356, 361; 428/436, 437, 441, 442
See application file for complete search history.

(56) References Cited

U.S. PATENT DOCUMENTS

| | | | | |
|---|---|---|---|---|
| 6,673,456 | B1 * | 1/2004 | Kobata et al. | 428/437 |
| 6,780,515 | B2 * | 8/2004 | Dobler | 428/432 |
| 7,655,314 | B2 * | 2/2010 | Marumoto | 428/437 |
| 2002/0150744 | A1 * | 10/2002 | Nagai | 428/215 |
| 2008/0053613 | A1 * | 3/2008 | Wang et al. | 156/331.1 |

FOREIGN PATENT DOCUMENTS

EP 1 072 959 A1 * 1/2001

OTHER PUBLICATIONS

Product Data Sheet for Irgastab™ FS 301, published by Ciba Specialty Chemicals on Mar. 1, 2002.

* cited by examiner

*Primary Examiner* — D. S. Nakarani

(74) *Attorney, Agent, or Firm* — Maria M. Kourtakis; Kelly Law Registry

(57) ABSTRACT

Provided is a solar control composition comprising an infrared absorbing phthalocyanine compound or naphthalocyanine compound and a resin having a modulus from 20,000 psi (138 MPa) to 1000 psi (7 MPa) and solar control laminates comprising the solar control composition of the invention.

19 Claims, No Drawings

SOLAR CONTROL LAMINATES

CROSS-REFERENCE TO RELATED APPLICATIONS

This application is a continuation in part of U.S. application Ser. No. 11/977,817, filed on Dec. 28, 2006, which in turn is a continuation in part of U.S. application Ser. No. 11/646,649, filed on Oct. 26, 2007, which claims priority under 35 U.S.C. §120 to U.S. Provisional Application Nos. 60/755,487 and 60/755,492, filed on Dec. 30, 2005, each of which is incorporated herein by reference in its entirety.

BACKGROUND OF THE INVENTION

1. Field of the Invention

The present invention pertains to the field of devices that reduce the transmission of radiation, and particularly to devices that reduce the transmission of infrared light.

2. Description of the Related Art

Several patents and publications are cited in this description in order to more fully describe the state of the art to which this invention pertains. The entire disclosure of each of these patents and publications is incorporated by reference herein.

Glass laminated products or "safety glass" have contributed to society for almost a century. Safety glass is characterized by high impact and penetration resistance, and by minimal scattering of glass shards and debris upon shattering. The laminates typically consist of a sandwich of a polymeric film or sheet interlayer that is placed between two glass sheets or panels. One or both of the glass sheets may be replaced with optically clear rigid or non-rigid polymeric sheets such as sheets of polycarbonate materials or polyester films. Safety glass has further evolved to include more than two layers of glass and/or polymeric sheets bonded together with more than one interlayer.

Beyond the well known safety glass commonly used in automotive windshields, glass laminates are incorporated as windows into trains, airplanes, ships, and nearly every other mode of transportation. The architectural use of safety glass has also expanded rapidly in recent years, as designers incorporate more glass surfaces into buildings.

Society continues to demand more functionality from laminated glass products beyond its optical and decorative capabilities and safety characteristics. One desirable goal is the reduction of energy consumption within structures, such as automobiles or buildings through the development of solar control glazing. Because the near infrared spectrum is not sensed by the human eye, a typical approach has been to develop glass laminates that prevent a portion of solar energy from the near infrared spectrum from entering the structure. For example, the energy expended on air conditioning may be reduced in structures equipped with solar control windows that block a portion of the near infrared spectrum without a reduction or distortion of the transmitted visible light spectrum.

Solar control in glass laminates may be achieved through modification of the glass or of the polymeric interlayer, by the addition of further solar control layers, or combinations of these approaches. One form of solar control laminated glass includes metallized substrate films, e.g., polyester films that have electrically conductive aluminum or silver metal layers. The metallized films generally reflect light of the appropriate wavelengths to provide adequate solar control properties. Metallized films are commonly manufactured by vacuum deposition or sputtering processes that require a high vacuum apparatus and a precision atmosphere controlling system. In addition to infrared light, metallized films also reflect certain radio wavelengths, thus impairing the function of radio, television, global positioning systems (GPS), automated toll collection, keyless entry, communication systems, automatic garage openers, automated teller machines, radio frequency identification (RFID), and like systems commonly used in automobiles or other structures that may be protected by solar control laminated glass. This impairment is a direct result of the metal layers being continuous and, therefore, electrically conductive.

A more recent trend has been the use of metal containing nanoparticles that absorb rather than reflect infrared light. To preserve the clarity and transparency of the substrate, these materials ideally have nominal particle sizes below about 200 nanometers (nm). Because these materials do not form electrically conductive films, the operation of radiation transmitting and receiving equipment located inside structures protected by this type of solar control glazing is not impeded. The addition the nanoparticles into the polymeric interlayers necessarily complicates the processes by which these laminates are produced, however.

Infrared absorbing phthalocyanines and phthalocyanine-based materials are known for use in optical information recording media, sometimes in conjunction with a binder resin that may comprise polyvinyl butyral. Recent examples of patents in this art area include U.S. Pat. Nos. 6,057,075; 6,197,472; 6,576,396; 6,197,464; 6,207,334; 6,238,833; 6,376,143; 6,465,142; and 6,489,072.

Alkoxy-substituted phthalocyanine compounds have also been used as infrared absorbing materials in optical information recording media, sometimes in conjunction with a binder resin. See, for example, U.S. Pat. Nos. 4,769,307; 5,296,162; 5,409,634; 5,358,833; 5,446,142; 5,646,273; 5,750,229; 5,594,128; 5,663,326; and 6,726,755; and European Patent No. 0 373 643.

Also known are various solar control devices that include organic infrared absorbing materials such as phthalocyanine compounds. For example, the Avecia Corp., Wilmington, Del., markets several phthalocyanine compounds as infrared absorbers for incorporation into glazing materials such as glass, plastics and film coatings. For examples of phthalocyanine containing glass laminate interlayer compositions, see U.S. Pat. Nos. 5,830,568; 6,315,848; 6,329,061; and 6,579,608; U.S. Patent Application Publication No. 2004/0241458; and International Patent Application Publication No. 2002/070254.

Infrared absorbing naphthalocyanine materials have also been generally disclosed for use in optical information recording media, which may include binder resins. For example, see U.S. Pat. Nos. 4,492,750; 4,529,688; 4,769,307; 4,886,721; 5,021,563; 4,927,735; 4,960,538; 5,282,894; 5,446,142; 5,484,685; 6,197,851; 6,210,848; 6,641,965; 5,039,600 and 5,229,859. Certain naphthalocyanine materials dispersed within binder resins, which may include polyvinyl butyral, have been disclosed within the art. For example, U.S. Pat. No. 4,766,054 describes an optical recording medium that includes certain naphthalocyanine dyes.

Phthalocyanine-type and naphthalocyanine-type infrared absorbers are often relatively inefficient solar control agents, however, because they are highly colored. Stated alternatively, many phthalocyanines and naphthalocyanines have a significant level of absorption of visible wavelengths.

It remains desirable, therefore, to provide new solar control laminates that reduce the transmission of infrared energy and provide more efficient transmission of visible light and radio frequencies.

SUMMARY OF THE INVENTION

The present invention provides a composition consisting essentially of an infrared absorbing phthalocyanine compound or naphthalocyanine compound and a plasticizer.

The present invention also provides a solar control composition comprising an infrared absorbing phthalocyanine compound or naphthalocyanine compound and a resin having a modulus of from 20,000 psi (138 MPa) to 1000 psi (7 MPa). Preferably, the resin has a modulus of from 15,000 psi (104 MPa) to 1000 psi (7 MPa) and comprises polyvinylbutyral or ethylene-co-vinyl acetate.

The present invention further provides a solar control laminate comprising an infrared absorbing phthalocyanine compound or naphthalocyanine compound and a resin having a modulus of from 20,000 psi (138 MPa) to 1000 psi (7 MPa). Preferably, the resin has a modulus from 15,000 psi (104 MPa) to 1000 psi (7 MPa) and comprises polyvinylbutyral or ethylene-co-vinyl acetate.

The invention further provides a solar control laminate comprising a solar control layer comprised of polyvinylbutyral or ethylene-co-vinyl acetate and a concentration of an infrared absorbing phthalocyanine compound or naphthalocyanine compound, wherein said solar control laminate has a layer thickness, a level of transmission of solar light and a level of transmission of visible light such that when the laminate is simulated using Simulation Method A, the simulated level of transmittance of visible light, $T_{vis-sim}$, is $0.65 < T_{vis-sim} < 0.75$ and the simulated level of transmittance of solar light, $T_{sol-sim}$, for a phthalocyanine compound $< (0.932 (T_{vis-sim}) - 0.146)$ and for a naphthalocyanine compound $< (0.481(T_{vis-sim}) - 0.166)$.

Further provided is a method of reducing the transmission of infrared radiation to the interior of a structure having an exterior window. The method comprises constructing a solar control laminate of the invention and inserting this solar control laminate into the exterior window of the structure.

DETAILED DESCRIPTION OF THE INVENTION

The definitions herein apply to the terms as used throughout this specification, unless otherwise limited in specific instances.

The term "solar control", as used herein, refers to reducing the intensity of any wavelength of radiation emitted by the sun. Preferably, in the present invention, the intensity of an infrared or near infrared wavelength is reduced and the intensity of visible wavelengths is substantially unchanged. Under these conditions, the transmission of heat is reduced, while visual transparency is maintained and the appearance of colored objects is not substantially distorted.

The terms "finite amount" and "finite value", as used herein, refer to an amount or value that is greater than zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors that will be apparent to those of skill in the art. In general, an amount, size, formulation, parameter or other quantity or characteristic is "about" or "approximate" whether or not expressly stated to be such.

The term "or", when used alone herein, is inclusive; more specifically, the phrase "A or B" means "A, B, or both A and B". Exclusive "or" is designated herein by terms such as "either A or B" and "one of A or B", for example.

When materials, methods, or machinery are described herein with the term "known to those of skill in the art", or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

All percentages, parts, ratios, and the like set forth herein are by weight, unless otherwise limited in specific instances.

Finally, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

In one aspect, the present invention provides a composition consisting essentially of a plasticizer and a phthalocyanine or a naphthalocyanine compound. This composition is useful as a precursor to the solar control layers, described more fully hereinbelow, that contain a phthalocyanine or a naphthalocyanine compound and a resin.

The term "phthalocyanine compound", as used herein, refers to phthalocyanine and its ions, metallophthalocyanines, phthalocyanine derivatives and their ions, and metallated phthalocyanine derivatives. The term "phthalocyanine derivative", as used herein, refers to any compound having a phthalocyanine core. Stated alternatively, phthalocyanine derivatives include any molecule comprising a tetrabenzo[b,g,l,q]-5,10,15,20-tetraazaporphyrin moiety and having any number of peripheral substituents in place of any of the peripheral hydrogen atoms bound to the carbon atoms at the 1, 2, 3, 4, 8, 9, 10, 11, 15, 16, 17, 18, 22, 23, 24, or positions of the phthalocyanine moiety. When more than one peripheral substituent is present, the peripheral substituents may be the same or different.

The term "naphthalocyanine compound", as used herein, refers to naphthalocyanine and its ions, metallonaphthalocyanines, naphthalocyanine derivatives and their ions, and metallated naphthalocyanine derivatives. The term "naphthalocyanine derivative", as used herein, refers to any compound having a naphthalocyanine core. Stated alternatively, naphthalocyanine derivatives include any molecule comprising a tetranaphthalo[b,g,l,q]-5,10,15,20-tetraazaporphyrin moiety and having any number of peripheral substituents in place of any of the peripheral hydrogen atoms bound to the carbon atoms of the naphthalocyanine moiety. When more than one peripheral substituent is present, the peripheral substituents may be the same or different.

Phthalocyanine and naphthalocyanine compounds suitable for use in the invention include any infrared absorbing phthalocyanine or naphthalocyanine compound. Some of the suitable phthalocyanine and naphthalocyanine compounds may function as dyes, i.e., they are soluble in the plasticizer composition. Alternatively, others may function as pigments, i.e., they are insoluble in the plasticizer composition.

Suitable phthalocyanine and naphthalocyanine compounds may be metallated, for example with monovalent metals including sodium, potassium and lithium; with divalent metals including copper, zinc, iron, cobalt, nickel, ruthenium, rhodium, palladium, platinum, manganese, tin, vanadium and calcium; or with trivalent metals, tetravalent metals, or metals of greater valency.

In general, the charge of any metallated phthalocyanine or naphthalocyanine compound, aside from those containing a divalent metal, will be balanced by a cation or anion of appropriate charge that is often coordinated axially to the metal ion. Examples of suitable ions include, without limitation, halogen anions, metal ions, hydroxide anion, oxide anion ($O^{2-}$) and alkoxide anions. Preferred metallophthalocyanine and metallonaphthalocyanine compounds include, for example, $DAl^{3+}Cl^-$, $DAl^{3+}Br^-$, $DIn^{3+}Cl^-$, $DIn^{3+}Br^-$, $DIn^{3+}I^-$, $DSi^{4+}(Cl^-)_2$, $DSi^{4+}(Br^-)_2$, $DSi^{4+}(F^-)_2$, $DSn^{4+}(Cl^-)_2$, $DSn^{4+}(Br^-)_2$, $DSn^{4+}(F^-)_2$, $DGe^{4+}(Cl^-)_2$, $DGe^{4+}(Br^-)_2$, $DGe^{4+}(F^-)_2$, $DSi^{4+}(OH^-)_2$, $DSn^{4+}(OH^-)_2$, $DGe^{4+}(OH^-)_2$, $DV^{4+}O^{2-}$, and $DTi^{4+}O^{2-}$, wherein "D" refers to the dianion of phthalocyanine or naphthalocyanine or a peripherally substituted phthalocyanine or naphthalocyanine. Preferably, for the phthalocyanine compounds the metal comprises copper(II), nickel(II), or a mixture of copper(II) and nickel(II). Preferably, for the naphthalocyanine compounds the metal comprises copper(II), nickel(II), silicon(IV), or a mixture of two or more of copper (II), nickel(II) and silicon(IV).

Most preferably, the phthalocyanine and naphthalocyanine compounds are unmetallated.

Phthalocyanine and naphthalocyanine derivatives are preferred. Preferably, for the phthalocyanine derivatives one hydrogen atom of each of the four peripheral benzo rings is substituted, symmetrically or asymmetrically. Also preferably, the phthalocyanine derivatives may be substituted at the 1, 4, 8, 11, 15, 18, 22 and 25 positions, or at all sixteen of the peripheral carbon positions. Preferably, for the naphthalocyanine derivatives one or two hydrogen atoms of each of the four peripheral naphthalo rings are substituted, symmetrically or asymmetrically. Also preferably, the naphthalocyanine derivatives may be substituted at all twenty-four of the peripheral carbon positions.

Suitable substituents for phthalocyanine or naphthalocyanine derivatives include halogens, alkyl groups, alkoxyalkyl groups, alkoxyl groups, aryloxy groups and partially halogenated or perhalogenated alkyl group. The alkyl substituents may be linear or branched. Specific examples of preferred alkyl substituents include methyl, ethyl, n-propyl, isopropyl, n-butyl, isobutyl, sec-butyl, tert-butyl, neopentyl, isopentyl, neo-pentyl, 1,2-dimethylpropyl, n-hexyl, cyclohexyl, 1,3-dimethylbutyl, 1-iso-propylpropyl, 1,2-dimethylbutyl, n-heptyl, 1,4-dimethylpentyl, 2-methyl-1-isopropylpropyl, 1-ethyl-3-methylbutyl, n-octyl, 2-ethylhexyl, 3-methyl-1-isopropylbutyl, 2-methyl-1-isopropylbutyl, 1-t-butyl-2-methylpropyl, n-nonyl groups and mixtures thereof. Specific examples of alkoxyalkyl substituents include methoxymethyl, methoxyethyl, ethoxyethyl, propoxyethyl, butoxyethyl, methoxyethoxyethyl, ethoxyethoxyethyl, dimethoxymethyl, diethoxymethyl, dimethoxyethyl, diethoxyethyl groups and mixtures thereof. Specific examples of partially halogenated or perhalogenated alkyl substituents include chloromethyl, 2,2,2-trichloromethyl, trifluoromethyl, 1,1,1,3,3,3-hexafluoro-2-propyl groups and mixtures thereof. Specific examples of aryloxy substituents include phenoxy, 4-tert-butylphenyloxy, 4-cumylphenoxy, naphthyloxy groups and mixtures thereof.

More preferably, the phthalocyanine or naphthalocyanine compound comprises an alkoxy-substituted phthalocyanine or naphthalocyanine. Tetrasubstituted and octasubstituted alkoxy phthalocyanine or naphthalocyanine compounds are preferred. Examples of preferred alkoxyl groups include methoxyl, ethoxyl, n-propoxyl, iso-propoxyl, n-butoxyl, iso-butoxyl, sec-butoxyl, tert-butoxyl, n-pentoxyl, iso-pentoxyl, neo-pentoxyl, 1,2-dimethylpropoxyl, n-hexyloxyl, iso-hexyloxyl, neo-hexyloxyl, cyclohexyloxyl, heptyloxyl, 1,3-dimethylbutoxyl, 1-iso-propylpropoxyl, 1,2-dimethylbutoxyl, 1,4-dimethylpentoxyl, 2-methyl-1-isopropylpropoxyl, 1-ethyl-3-methylbutoxyl, 2-ethylhexoxyl, 3-methyl-1-isopropylbutoxyl, 2-methyl-1-isopropylbutoxyl, 1-t-butyl-2-methylpropoxyl, n-octyloxyl, n-nonyloxyl, n-decyloxyl and mixtures thereof. Butoxyl groups are preferred.

Specific examples of preferred phthalocyanine compounds include aluminum 1,4,8,11,15,18,22,25-octabutoxy-29H,31H-phthalocyanine triethylsiloxide; copper(II) 1,4,8,11,15,18,22,25-octabutoxy-29H,31H-phthalocyanine; nickel(II) 1,4,8,11,15,18,22,25-octabutoxy-29H,31H-phthalocyanine; 1,4,8,11,15,18,22,25-octabutoxy-29H,31H-phthalocyanine; zinc 1,4,8,11,15,18,22,25-octabutoxy-29H,31H-phthalocyanine; copper(II) 2,3,9,10,16,17,23,24-octakis(octyloxy)-29H,31H-phthalocyanine; 2,3,9,10,16,17,23,24-octakis(octyloxy)-29H,31H-phthalocyanine; silicon 2,3,9,10,16,17,23,24-octakis(octyloxy)-29H,31H-phthalocyanine dihydroxide; zinc 2,3,9,10,16,17,23,24-octakis(octyloxy)-29H,31H-phthalocyanine; and mixtures thereof.

Still more preferably, the phthalocyanine compound comprises an n-butoxyl substituted phthalocyanine compound. Again, tetrasubstituted and octasubstituted alkoxy phthalocyanine compounds are preferred. Specific examples of preferred butoxyl phthalocyanine compounds include aluminum 1,4,8,11,15,18,22,25-octabutoxy-29H,31H-phthalocyanine triethylsiloxide; copper(II) 1,4,8,11,15,18,22,25-octabutoxy-29H,31H-phthalocyanine; nickel(II) 1,4,8,11,15,18,22,25-octabutoxy-29H,31H-phthalocyanine; 1,4,8,11,15,18,22,25-octabutoxy-29H,31H-phthalocyanine; zinc 1,4,8,11,15,18,22,25-octabutoxy-29H,31H-phthalocyanine; and mixtures thereof.

Specific examples of preferred naphthalocyanine compounds include, for example, aluminum 5,9,14,18,23,27,32,36-octabutoxy-2,3-naphthalocyanine triethylsiloxide, copper(II) 5,9,14,18,23,27,32,36-octabutoxy-2,3-naphthalocyanine, nickel(II) 5,9,14,18,23,27,32,36-octabutoxy-2,3-naphthalocyanine, 5,9,14,18,23,27,32,36-octabutoxy-2,3-naphthalocyanine, zinc 5,9,14,18,23,27,32,36-octabutoxy-2,3-naphthalocyanine and mixtures thereof.

Alternatively, preferred phthalocyanine and naphthalocyanine compounds may be identified empirically, by exhibiting a favorable balance of optical properties. Transmission spectra are obtained for films containing a phthalocyanine and naphthalocyanine compound or laminates comprising such a film. The processed transmission spectrum of a given film or the measured transmission spectrum of a given laminate is used in a simulation program as described below to calculate the solar transmittance ($T_{sol-sim}$), the transmittance of all light in the solar spectrum, and the visible transmittance ($T_{vis-sim}$), the transmittance of light in the visible spectrum weighted by the sensitivity of the human eye for a simulated glass/resin/glass laminate containing an resin interlayer with the processed transmission spectrum. The $T_{vis-sim}$ and the parameters of the glass and the resin are used to calculate a concentration of the preferred phthalocyanine or naphthalocyanine compound in the polyvinyl butyral or ethylene-co-vinyl acetate such that the $T_{vis-sim}$ is between 0.65 and 0.75. Preferred phthalocyanine compounds provide a $T_{sol-sim}$ less than ($0.932\ T_{vis-sim} - 0.146$). More preferred phthalocyanine compounds provide a $T_{sol-sim}$ less than ($0.964\ T_{vis-sim} - 0.192$), and still more preferred phthalocyanine compounds provide a $T_{sol-sim}$ less than ($1.086\ T_{vis-sim} - 0.305$). Preferred naphthalocyanine compounds provide a $T_{sol-sim}$ less than ($0.481\ T_{vis-sim} - 0.166$).

Other analyses may also define preferred phthalocyanine or naphthalocyanine compounds. For example, the phthalocyanine or naphthalocyanine compound and its calculated concentration may be adjusted to provide any visible light transmission that is desired. More specifically, automotive windshield uses generally require a visible light transmission of 0.75 or greater. However, architectural laminates may have significantly lower levels of visible light transmission, such as 0.50 and less.

Preferably, the amount of phthalocyanine or naphthalocyanine compound in the plasticizer is about 0.0001 to about 10 wt %, more preferably about 0.001 to about 5 wt %, more preferably about 0.001 to about 1 wt %, and more preferably about 0.01 to about 0.1 wt %, based on the total weight of the phthalocyanine/plasticizer or naphthalocyanine/plasticizer composition.

Suitable plasticizers for the composition may include any known within the art. Preferable plasticizers are known within the art, for example, as disclosed within U.S. Pat. No. 3,841,890, U.S. Pat. No. 4,144,217, U.S. Pat. No. 4,276,351, U.S. Pat. No. 4,335,036, U.S. Pat. No. 4,902,464, U.S. Pat. No. 5,013,779, and WO 96/28504. Plasticizers commonly employed are esters of a polybasic acid or a polyhydric alcohol. Preferable plasticizers are diesters obtained by the reaction of triethylene glycol or tetraethylene glycol with aliphatic carboxylic acids having from 6 to 10 carbon atoms; diesters obtained from the reaction of sebacic acid with aliphatic alcohols having from 1 to 18 carbon atoms; oligoethylene glycol di-2-ethylhexanoate, tetraethylene glycol di-n-heptanoate, dihexyl adipate, dioctyl adipate, mixtures of heptyl and nonyl adipates, dibutyl sebacate, tributoxyethylphosphate, isodecylphenylphosphate, triisopropylphosphite, polymeric plasticizers such as the oil-modified sebacid alkyds, and mixtures of phosphates and adipates, and adipates and alkyl benzyl phthalates and mixtures thereof. More preferable plasticizers are triethylene glycol di-2-ethylhexanoate, tetraethylene glycol di-n-heptanoate, dibutyl sebacate, and mixtures thereof. The most preferable plasticizers are triethylene glycol di-2-ethylhexanoate and tetraethylene glycol di-n-heptanoate. A single plasticizer can be used or a mixture of plasticizers can be used. For convenience, when describing the compositions of the present invention, a mixture of plasticizers can be referred to herein as "a plasticizer". That is, the singular form of the word "plasticizer" as used herein can represent the use of either one plasticizer or the use of a mixture of two or more plasticizers.

In formulating the composition of the invention it may be advantageous to include processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers, crosslinking agents, hardening agents, pH adjusting agents, antifoaming agents, and wetting agents. The specific identity of the additives, their levels, and the methods of incorporating the additives into the composition may be selected according to methods that are known in the art.

The present invention further provides a solar control composition that comprises an infrared absorbing phthalocyanine or naphthalocyanine compound and a resin. Preferably, the resin comprises polyvinylbutyral or ethylene-co-vinyl acetate. This solar control composition may also be referred to herein as a "matrix composition".

The solar control composition comprises a resin having a modulus of from 20,000 psi (138 MPa) to 1000 psi (7 MPa), preferably from 15,000 psi (104 MPa) to 1000 psi (7 MPa). Examples of matrix resins include poly(ethylene-co-vinyl acetate); ethyl acrylic acetate (EM); ethyl methacrylate (EMAC); metallocene-catalyzed polyethylene; plasticized poly(vinyl chloride); ISD resins as described, for example, in U.S. Pat. Nos. 5,624,763 and 5,464,659; polyurethanes; acoustic modified poly(vinyl chloride) as described, for example, in U.S. Pat. Nos. 4,382,996 and 5,773,102 and commercially available from the Sekisui Company; plasticized poly(vinyl butyral); acoustic modified poly(vinyl butyral) as described, for example, in JP A05138840, and combinations thereof. The modulus of each of these materials is set forth in U.S. Pat. No. 6,432,522. Preferably, the matrix resin comprises an ethylene vinyl acetate copolymer or a polyvinyl butyral.

The solar control composition also comprises at least one phthalocyanine or naphthalocyanine compound. The amount of phthalocyanine compound(s) is from about 0.01 to about 80 weight percent; preferably, from about 0.01 to about 10 weight percent; and more preferably from about 0.01 to about 5 weight percent, based on the total weight of the solar control composition, when the solar control composition is used as an infrared cutoff filter. The amount of naphthalocyanine compound(s) is from about 0.01 to about 50 weight percent; preferably, from about 0.01 to about 10 weight percent; and more preferably from about 0.01 to about 5 weight percent, based on the total weight of the solar control composition, when the solar control composition is used as an infrared cutoff filter. The amount of phthalocyanine compound(s) in the solar control composition is from about 30 to about 80 weight percent; preferably from about 30 to about 50 weight percent; and more preferably from about 35 to about 45 weight percent, based on the total weight of the composition, when the solar control composition is prepared as a concentrate. The amount of naphthalocyanine compound(s) in the solar control composition is from about 30 to about 50 weight percent; and more preferably from about 35 to about 45 weight percent, based on the total weight of the composition, when the solar control composition is prepared as a concentrate.

The solar control compositions may also incorporate an effective amount of one or more thermal stabilizers. Any known thermal stabilizer is suitable for use in the present invention. Preferred classes of thermal stabilizers include phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and the like and mixtures thereof.

The compositions of the present invention preferably incorporate from about 0.01 to about 10.0 weight percent of thermal stabilizers, more preferably from about 0.01 to about 5.0 weight percent, and still more preferably from about 0.01 to about 1.0 weight percent, based on the total weight of the solar control composition.

The solar control layer may also incorporate an effective amount of one or more UV absorbers. Any known UV absorber is suitable for use in the present invention. Preferred classes of UV absorbers include benzotriazoles, hydroxybenzophenones, hydroxyphenyl triazines, esters of substituted and unsubstituted benzoic acids, and the like and mixtures thereof.

Preferably, the solar control composition incorporates from about 0.01 to about 10.0 weight percent of the one or more UV absorbers, more preferably from about 0.01 to about 5.0 weight percent, and still more preferably from about 0.01 to about 1.0 weight percent UV absorbers, based on the total weight of the solar control composition.

The solar control composition may incorporate an effective amount of one or more hindered amine light stabilizers (HALS). Generally, hindered amine light stabilizers are secondary or tertiary, acetylated, N-hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function.

The solar control composition preferably incorporates from about 0.01 to about 10.0 weight percent of hindered amine light stabilizers, more preferably from about 0.01 to about 5.0 weight percent, and still more preferably from about 0.01 to about 1.0 weight percent, based on the total weight of the solar control composition.

The matrix composition may also comprise one or more plasticizers, dispersants, surfactants, chelating agents, coupling agents, processing aides, flow enhancing additives, lubricants, pigments, dyes, flame retardants, impact modifiers, nucleating agents to increase crystallinity, antiblocking agents such as silica, UV stabilizers, adhesives, primers, crosslinking agents, hardening agents, pH adjusting agents, antifoaming agents inorganic infrared absorbents, organic infrared absorbents, and wetting agents. Suitable amounts of these additives and methods of incorporating the additives into polymer compositions will be available to those of skill in the art. See, for example, "Modern Plastics Encyclopedia", McGraw-Hill, New York, N.Y. 1995.

The solar control compositions may be made by any suitable process. Preferably, the phthalocyanine or naphthalocyanine compound(s) are dispersed in the resin by high shear mixing of the molten resin with the phthalocyanine or naphthalocyanine compound(s) and other optional components. The high shear mixing may be provided by static mixers, rubber mills, Brabender mixers, single screw extruders, twin screw extruders, heated or unheated two-roll mills, and the like. The resin and/or the matrix composition may be dried prior to any mixing step. The matrix composition may then be mixed with additional phthalocyanine or naphthalocyanine compound(s) and other optional components as a dry blend, typically referred to as a "pellet blend". Alternatively, the resin and the phthalocyanine or naphthalocyanine compounds may be cofed through two different feeders. Alternatively, the phthalocyanine or naphthalocyanine compound(s) may be dissolved, dispersed or suspended in a solvent or a plasticizer to form a concentrate. The concentrate is then added to the resin through an intensive melt mixing process. Generally, the resin's melt processing temperature will be within the range of about 50° C. to about 300° C. The exact processing conditions will depend on the particular resin. The amounts of resin and concentrate are selected so that the final concentration of phthalocyanine or napthalocyanine compound in the solar control composition yields the desired reduction in the transmission of solar radiation.

The amount of phthalocyanine or naphthalocyanine compound within the matrix resin affects the efficiency of the process to reduce the phthalocyanine or naphthalocyanine particles to a usable size. For optimal clarity the particles are preferably approximately nanoparticulate. As is well-known, the melt viscosity of a polymer/particle blend generally increases as the volume concentration of particles increases. The volume concentration of particles must therefore be in a range that results in a sufficiently high melt viscosity to impart significant shear stress during the mixing process. The shear stress deagglomerates the crude phthalocyanine or naphthalocyanine particles to primary particles. Conversely, the highest obtainable concentration of particles in the resin is limited by the highest melt viscosity that can be processed on the selected equipment.

Further provided by the present invention is a shaped article comprising a solar control composition of the invention. The shaped articles are preferably coatings, films, multilayer films, sheets, or multilayer sheets.

Preferably, the shaped article is a solar control layer. The solar control layer of the invention may be a coating, a film, a sheet, a multilayer film, or a multilayer sheet. The difference between a film and a sheet is the thickness; however, there is no industry standard that defines the thickness at which a film becomes a sheet. For purposes of this invention, a film has a thickness of about 10 mils (0.25 mm), or less. Preferably, the film has a thickness of about 0.5 mils (0.012 mm) to about 10 mils (0.25 mm). More preferably, the film has a thickness of about 1 mil (0.025 mm) to about 5 mils (0.13 mm). For automotive applications, the film thickness may be preferably within the range of about 1 mil (0.025 mm) to about 4 mils (0.1 mm). For purposes of this invention, a sheet has a thickness of greater than about 10 mils (0.25 mm). Preferably, the sheet has a thickness of about 15 mils (0.38 mm) or greater. More preferably, the sheet has a thickness of about 30 mils (0.75 mm), or greater.

Preferred polymeric resins for use in films include poly (ethylene terephthalate), polycarbonate, polypropylene, polyethylene, polypropylene, cyclic polyolefins, norbornene polymers, polystyrene, syndiotactic polystyrene, styrene-acrylate copolymers, acrylonitrile-styrene copolymers, poly (ethylene naphthalate), polyethersulfone, polysulfone, nylons, poly(urethanes), acrylics, cellulose acetates, cellulose triacetates, vinyl chloride polymers, polyvinyl fluoride, polyvinylidene fluoride, poly(vinyl butyral), ethylene-co-vinyl acetate, and the like. Preferably the film is a biaxially oriented poly(ethylene terephthalate) film.

Preferred polymeric resins for use in sheets include independently selected polymers having a modulus of from 20,000 psi (138 MPa) to 1000 psi (7 MPa). More preferably, the sheet comprises an independently selected polymer having a modulus of from 15,000 psi (104 MPa) to 1000 psi (7 MPa). Preferred examples of matrix materials and polymeric resins for use in sheets include, for example, poly(ethylene-co-vinyl acetate) compositions; ethyl acrylic acetate; ethyl methacrylate; metallocene-catalyzed polyethylene; plasticized poly(vinyl chloride); ISD resins; polyurethane; acoustically modified poly(vinyl chloride), an example of which is commercially available from the Sekisui Company; plasticized poly(vinyl butyral) compositions; acoustically modified poly(vinyl acetal) compositions, acoustically modified poly(vinyl butyral) compositions; and combinations thereof.

Preferably, the solar control layer is transparent to visible light. Also preferably, the melt processing temperature of the film and sheet compositions is from about 50° C. to about 300° C., and more preferably from about 100° C. to about 250° C. The film and sheet compositions generally have excellent thermal stability, which allows for processing at high enough temperatures to reduce the effective melt viscosity.

Poly(vinyl butyral) is a more preferred polymeric resin for sheets. Preferred poly(vinyl butyral) resins have a weight average molecular weight range of from about 30,000 to about 600,000 Daltons, preferably of from about 45,000 to about 300,000 Daltons, more preferably from about 200,000 to 300,000 Daltons, as measured by size exclusion chromatography using low angle laser light scattering. Preferable poly(vinyl butyral) materials comprise, on a weight basis, about 5 to about 30 percent, preferably about 11 to about 25 percent, and more preferably about 15 to about 22 percent hydroxyl groups, calculated as polyvinyl alcohol (PVOH). In addition, preferable poly(vinyl butyral) materials include about 0 to about 10 percent, preferably about 0 to about 3 percent residual ester groups, calculated as polyvinyl ester, typically acetate groups, with the balance being butyraldehyde acetal. The poly(vinyl butyral) may also include a relatively small amount of acetal groups other than butyral, for example, 2-ethyl hexanal, as described in U.S. Pat. No. 5,137,954. Poly(vinyl butyral) resin may be produced by aqueous or solvent acetalization or by any other suitable means.

Preferably, the poly(vinyl butyral) contains at least one plasticizer. The total amount of plasticizer depends on the specific poly(vinyl butyral) resin and the desired properties. Plasticizers commonly employed are esters of a polybasic acid or a polyhydric alcohol.

Poly(ethylene-co-vinyl acetate) resins are also more preferred polymeric resins for use in sheets. Suitable poly(ethylene-co-vinyl acetate) resins include those that may be obtained from the Bridgestone Corporation, the Exxon Corporation, Specialized Technologies Resources, Inc. and E.I. du Pont de Nemours & Co. of Wilmington, Del. ("DuPont").

The poly(ethylene-co-vinyl acetate) resins may incorporate other unsaturated comonomers including, for example, methyl acrylate, methyl methacrylate, butyl acrylate, butyl methacrylate, glycidyl methacrylate, acrylic acid, methacrylic acid and mixtures thereof. Any of the plasticizers described above may be used with the poly(ethylene-co-vinyl acetate) resins.

An adhesion control additive for controlling the adhesive bond between a glass rigid layer and the polymeric film or sheet may be included in the films or sheets comprising poly(vinyl butyral). Adhesion control additives are generally alkali metal or alkaline earth metal salts of organic or inorganic acids.

The solar control layers of the invention may include one or more of the additives that are discussed above for use in the solar control compositions of the invention. They may also contain other additives that will be recognized as suitable by those of skill in the art.

The solar control layer may be made by any suitable means. A description of certain preferred means is set forth in detail below. The compositions of the invention (phthalocyanine or naphthalocyanine/plasticizer compositions and solar control compositions) may be used as intermediates in the fabrication of the solar control layer. For example, the solar control composition may be added as a concentrate to a pellet blend with a resin to form a solar control sheet. Other uses of the compositions of the invention to form the solar control layers of the invention will be apparent to those of skill in the art.

Thin films, for example, may be formed by dipcoating as described in U.S. Pat. No. 4,372,311, by compression molding as described in U.S. Pat. No. 4,427,614, by melt extrusion as described in U.S. Pat. No. 4,880,592, by melt blowing as described in U.S. Pat. No. 5,525,281, or by other suitable processes. Polymeric sheets may be formed by extrusion, calendering, solution casting or injection molding, for example. One of ordinary skill in the art will be able to identify appropriate process parameters based on the polymeric composition and on the method used for sheet or film formation.

Preferably, however, the solar control films of the present invention are formed by solution casting or extrusion, and the solar control sheets of the present invention are formed by extrusion. Extrusion is particularly preferred for formation of "endless" products, such as films and sheets, which emerge as a continuous length.

The solar control layers of the invention include multilayer laminates having two or more layers. The multilayer film and sheet structures may be formed by any suitable means, such as, for example, coextrusion, blown film, dipcoating, solution coating, blade, puddle, air-knife, printing, Dahlgren, gravure, powder coating, spraying, or other art processes. The individual layers may be joined together by heat, adhesive and/or tie layer, for example. Preferably, the multilayer films are produced through extrusion casting processes.

The sheets and films of the present invention may have smooth surfaces. Preferably, however, sheets to be used as interlayers within laminates have at least one roughened surface to effectively allow most of the air to be removed from between the surfaces of the laminate during the lamination process.

The solar control layer may comprise a film or sheet that is coated on one or both surfaces with the composition of the invention. The coating may result from the application of a coating solution, for example. The term "coating solution" encompasses phthalocyanine or naphthalocyanine compound(s) dissolved, dispersed or suspended in one or more polymer solutions, one or more polymer precursor solutions, one or more emulsion polymers, or mixtures of one or more polymer solution, polymer precursor solution, or emulsion polymer.

The coating solution may include one or more solvents that dissolve, partially dissolve, disperse, or suspend the binder. The solvent or solvent blends are selected by considering such properties as the solubility of the matrix resin, surface tension of the resulting coating solution and evaporation rate of the coating solution, the polarity and surface characteristics of the phthalocyanine compound(s) to be used and the chemical nature of any dispersants and other additives, the viscosity of the coating, and compatibility of the surface tension of the coating with the surface energy film material. The solvent or solvent blend should also be chemically inert to the binder material(s).

Alternatively, the solvent(s) may be partially or entirely replaced with a plasticizer. Suitable plasticizers are described in detail above. The plasticizer-based coating solutions, suspensions or dispersions may then be treated analogously to the solvent-based coating solutions.

The thickness of the coating is dependent in part on the amount of solvent in the coating solution and that the amount of phthalocyanine or naphthalocyanine compound(s) in the coating solution is determined largely by the amount of binder and solvent in the coating solution and by the amount of phthalocyanine or naphthalocyanine compound(s) desired in the coating.

To prepare a coating solution, the phthalocyanine or naphthalocyanine compound(s), the matrix resin, the optional additives and the solvent are mixed to homogeneously distribute the phthalocyanine or naphthalocyanine compound(s) throughout the polymer solution. Alternatively, the matrix resin and the phthalocyanine or naphthalocyanine compound(s) may be kneaded together to form a concentrate, which may, in turn, be added to the solvent, for example, as described in Intl. Appln. Publn. No. WO 01/00404 and U.S. Pat. No. 5,487,939. Regardless of how the coating solution is formed, it may be milled, such as through ball milling, roll milling, sand grinding milling, a paint shaker, a kneader, a dissolver, an ultrasonic dispersing machine, and the like, to deagglomerate the phthalocyanine or naphthalocyanine compound(s).

Alternatively, the phthalocyanine- or naphthalocyanine-containing coating may be an actinic radiation-curable coating comprising one or more radically polymerizable monomers and/or oligomers. Suitable radiation-curable matrix materials are described, for example, in U.S. Pat. No. 5,504,133.

Alternatively, the phthalocyanine- or naphthalocyanine-containing coating may include a photo-cationic-curable matrix material as described, for example, in U.S. Pat. No. 6,191,884. Generally, photo-cationically-curable matrix materials are epoxide and/or vinyl ether materials.

Alternatively, the phthalocyanine- or naphthalocyanine-containing coating compositions may be cured through heating processes. When a heating process-based cure is desired, it is preferable to incorporate an appropriate radical polymerization initiator such as azobisisobutyronitrile in the coating composition in place of a photoinitiator. Preferred heat-curing binders include, for example, thermoset resins, such as melamine resin, polyurethane resin, silicone resin, silicone-modified resin and mixtures thereof.

Preferably, the dry coating will be less than or equal to 10 mils (0.25 mm) thick, more preferably between about 0.1 mil (0.0025 mm) and about 5 mils (0.13 mm). Thicker coatings with a thickness of about 20 mils (0.50 mm) or greater can be formed.

The polymeric film or sheet may be coated by any suitable coating process. Extrusion is a particularly preferred method of coating polymeric films and sheets. Melt extrusion of coatings onto substrates is described, for example, in U.S. Pat. Nos. 5,294,483; 5,475,080; 5,611,859; 5,795,320; 6,183,814 and 6,197,380. Alternatively, a coating solution may be cast onto a polymeric film or sheet and dried to form the solar control film. Solution casting generally produces a more consistent coating thickness than melt extrusion.

One preferred method of forming a solar control layer is transfer printing. Suitable transfer printing processes generally include coating a solar control composition onto a releasable substrate, such as coated paper or polyester film. When dried or cured, the coating, i.e., the solar control layer, is contacted with a surface of a polymeric substrate or a rigid sheet, and subsequently transferred from the releasable substrate onto the substrate. If necessary, the uncoated side of the releasable substrate may be heated, to facilitate the release and adhesion of the coating to the substrate. General information about transfer printing is set forth in European patent No. 0 576 419.

Preferably, one or both surfaces of the solar control layer are treated to enhance adhesion. Essentially any adhesive or primer is suitable for use in the present invention. When using an adhesive or primer, one of ordinary skill in the art will be able to identify appropriate coating thicknesses and process parameters based on the composition of the solar control layer, the adhesive or primer, and the coating process.

The solar control layer may also have a hard coat layer formed from an ultraviolet (UV) curing resin on one or both surfaces to protect the outer polymeric layers from scratching, abrasion, and like insults. Any suitable hard coat formulation may be employed. One preferred hard coat is described in U.S. Pat. No. 4,027,073.

Also provided by the present invention is a solar control laminate comprising a solar control layer of the invention. In addition, the solar control laminate may comprise at least one additional layer, which may be a film, a sheet, or a coating on a film or a sheet. The additional layer may be a solar control layer or a solar control film. When the additional layer is a sheet, it may be a rigid or a flexible sheet. In certain preferred embodiments, the solar control laminates comprise one or more rigid sheets, a solar control layer, and at least one additional layer.

Preferred films for use as additional film layers include oriented and unoriented polyester films, polycarbonate films, polyurethane films and polyvinyl chloride films. Preferably, the additional film layer is biaxially oriented polyethylene terephthalate). Preferred sheets for use as additional sheet layers include sheets comprising polyvinyl butyral compositions, acoustic polyvinyl acetal compositions, acoustic polyvinyl butyral compositions, ethylene vinyl acetate compositions, thermoplastic polyurethane compositions, polyvinyl chloride copolymer compositions and ethylene acid copolymer compositions and ionomers derived therefrom.

Glass is a preferred rigid sheet. The term "glass" as used herein includes window glass, plate glass, silicate glass, sheet glass, float glass, colored glass, specialty glass which may, for example, include ingredients to control solar heating, glass coated with sputtered metals such as silver, for example, glass coated with antimony tin oxide (ATO) and/or indium tin oxide (ITO), E-glass, Solex™ glass (PPG Industries of Pittsburgh, Pa.) and Toroglass™. A typical glass type is 90 mil thick annealed flat glass, and it is preferable to orient the tin side of the glass to the interlayer to achieve optimal adhesion. Alternatively, the rigid sheet may be a rigid polymeric sheet comprised of a polycarbonate, acrylics, polyacrylate, cyclic polyolefins, metallocene-catalyzed polystyrene and mixtures or combinations thereof. Preferably, the rigid sheet is transparent. A metal or ceramic plate may be used as a rigid sheet, however, if transparency or clarity is not required in the solar control laminate.

The additional layer(s) may provide additional attributes such as acoustical barrier properties or may have functional coatings, for example containing organic infrared absorbers or reflectors. In applications in which electrical conductivity is not disadvantageous, the functional coatings may be sputtered metal layers.

Preferred solar control laminates may comprise a solar control layer and a polymeric film; a solar control layer and a polymeric sheet; a solar control layer and two polymeric sheets; a solar control layer, a polymeric film, and one or two polymeric sheets.

Preferred solar control laminates of the invention also include structures comprising adjacent layers as follows: polymeric film/solar control layer; polymeric sheet/solar control layer; rigid sheet/solar control layer; rigid sheet/polymeric sheet/solar control layer; first rigid sheet/polymeric sheet/solar control layer/additional polymeric sheet/second rigid sheet; rigid sheet/polymeric sheet/solar control layer/additional polymeric sheet/additional film; rigid sheet/additional polymeric sheet/additional film/polymeric sheet/solar control layer; rigid sheet/polymeric sheet/solar control layer/second polymeric sheet/additional film/third polymeric sheet/second rigid sheet; and first rigid sheet/polymeric sheet/solar control layer/additional polymeric sheet/second rigid sheet/second additional polymeric sheet/additional film/third additional polymeric sheet/third rigid sheet. In each of the above embodiments, "/" indicates adjacent layers. Moreover, the second layer of any film or sheet may be the same as or different from the first layer of that film or sheet. Likewise, the third layer may be the same as or different from the first and second layers of that film or sheet, and so on. Furthermore, in some preferred embodiments of the invention, the adjacent layers are directly laminated to each other so that they are adjoining or, more preferably, contiguous.

Any suitable process may be used to produce the solar control laminates of the present invention. Those skilled in the art are aware that different processes and conditions may be desirable, depending on the composition of the layers in the solar control laminate and on whether a rigid or flexible laminate is desired.

For example, a polymeric sheet and a solar control film may be bonded to each other and/or to one or more additional layers in a nip roll process. The additional layer(s) are fed along with the film or sheet of the invention through one or more calendar roll nips in which the two layers are subjected to moderate pressure and, as a result, form a weakly bonded laminate. Generally, the bonding pressure will be within the range of about 10 psi (0.7 kg/cm$^2$) to about 75 psi (5.3 kg/cm$^2$), and preferably it is within the range of about 25 psi (1.8 kg/cm$^2$) to about 30 psi (2.1 kg/cm$^2$). Typical line speeds are within the range of about 5 feet (1.5 m) to about 30 feet (9.2 m) per minute. The nip roll process may be conducted with or without moderate heating, which may be supplied by an oven or by a heated roll, for example. When heated, the polymer surfaces should achieve a temperature sufficient to promote temporary fusion bonding, that is, to cause the surfaces of the polymeric sheet or film to become tacky. Suitable surface temperatures for the preferred polymeric films and sheets of the invention are within the range of about 50° C. to about 120° C., and preferably the surface temperature is about 65° C. After fusion bonding, the laminate may be passed over one or more cooling rolls to ensure that the laminate is sufficiently strong and not tacky when taken up for storage. Process water cooling is generally sufficient to achieve this objective.

In another typical procedure to make a solar control laminate, an interlayer comprising a solar control laminate of the invention, such as an interlayer with a polymeric sheet/solar control film/polymeric sheet structure, is positioned between two glass plates to form a glass/interlayer/glass pre-press assembly. Preferably, the glass plates have been washed and dried. Air is drawn out from between the layers of the pre-press assembly using a vacuum bag (see, e.g., U.S. Pat. No. 3,311,517), a vacuum ring, or another apparatus capable of maintaining a vacuum of approximately 27 to 28 inches (689 to 711 mm Hg). The pre-press assembly is sealed under vacuum, then placed into an autoclave for heating under pressure. In order of increasing preference, the temperature in the autoclave is from about 130° C. to about 180° C., from about 120° C. to about 160° C., from about 135° C. to about 160° C., or from about 145° C. to about 155° C. The pressure in the autoclave is preferably about 200 psi (15 bar). In order of increasing preference, the pre-press assembly is heated in the autoclave for about 10 to about 50 minutes, about 20 to about 45 minutes, about 20 to about 40 minutes, or about 25 to about 35 minutes. After the heating and pressure cycle, the air in the autoclave is cooled without adding additional gas to maintain pressure in the autoclave. After about 20 minutes of cooling, the excess air pressure is vented and the laminates are removed from the autoclave.

Alternatively, a nip roll process may be used to produce solar control laminates. In one such process, the glass/interlayer/glass assembly is heated in an oven at or to between about 80° C. and about 120° C., preferably between about 90° C. and about 100° C., for about 30 minutes. Thereafter, the heated glass/interlayer/glass assembly is passed through a set of nip rolls so that the air in the void spaces between the glass and the interlayer is expelled. The edges of the structure are sealed at this point to produce a pre-press assembly that may be processed under vacuum in an autoclave, as described above, to produce a solar control laminate.

Solar control laminates may also be produced by non-autoclave processes. Several suitable non-autoclave processes are described in U.S. Pat. Nos. 3,234,062; 3,852,136; 4,341,576; 4,385,951; 4,398,979; 5,536,347; 5,853,516; 6,342,116; 5,415,909; in U.S. Patent Appln. Publn. No. 2004/0182493; in European Patent No. 1 235 683 B1; and in International Patent Appln. Publn. Nos. WO 91/01880 and WO 03/057478 A1. Generally, non-autoclave processes include heating the pre-press assembly and the application of vacuum, pressure or both. For example, the pre-press assembly may be passed through heating ovens and nip rolls.

For architectural uses and for uses in transportation vehicles, a preferred glass laminate has two layers of glass and a single interlayer comprising a solar control laminate of the invention that is directly laminated to both glass layers. Preferably, the interlayer also comprises a second polymeric sheet and each polymeric sheet is in contact with one of the glass layers. In these applications, the glass laminate preferably has an overall thickness of about 3 mm to about 30 mm. The interlayer typically has a thickness of about 0.38 mm to about 4.6 mm, and each glass layer usually is at least 1 mm thick. Also preferred are multilayered solar control laminates such as a five layer laminate of glass/interlayer/glass/interlayer/glass, a seven layer laminate of glass/interlayer/glass/interlayer/glass/interlayer/glass, and laminates comprising additional interlayer/glass assemblies.

EXAMPLES AND COMPARATIVE EXPERIMENTS

The examples are presented for illustrative purposes only, and are not intended to limit the scope of the invention in any manner.

Moduli

All moduli are determined according to ASTM D 638-03 (2003).

Room Temperature

The term "room temperature" as used herein refers to a temperature of 21° C.+/−5° C.

Standard Solution of Phthalocyanine Compounds

A phthalocyanine compound (approximately 2.0 mg, unless otherwise noted) was added to a mixture of N,N-dimethyl formamide (12.00 g+/−0.02 g) and methanol (4.00 g+/−0.05 g). Where noted, the solution contained dichloromethane in addition to or in place of the methanol. The mixture was stirred at room temperature until the phthalocyanine compound ceased to dissolve. Remaining solids, if any, were removed by decantation. Polyvinyl butyral was added to the resulting solution (Mowital™ B30T, 4.00 g+/−0.02 g, Kuraray Co., Ltd., Osaka, Japan) and the solution was stirred at room temperature until the polyvinyl butyral was dissolved.

Standard Stabilizing Solution

A standard stabilizing solution was made by mixing, at room temperature, Tinuvin™ 571 (0.40 g, believed to be 2-(2H-benzotriazol-2-yl)-6-dodecyl-4-methylphenol, CAS 23328-53-2, Ciba Specialty Chemicals, Basel, Switzerland), Tinuvin™ 123 (0.40 g, believed to be bis(1-octyloxy-2,2,6,6-tetramethyl-4-piperidyl)sebacate, CAS 129757-67-1, from Ciba Specialty Chemicals), 4-(1,1,3,3-tetramethylbutyl)phenol (0.08 g, CAS 140-66-9), N,N-dimethylformamide, (120.00 g), and methanol (40.00 g).

Standard Procedure for Preparation of Phtalocyanine- or Naphthalocyanine-Containing Layers on Polyester Films A standard solution of a phthalocyanine compound or a solution of a naphthalocyanine compound was equilibrated to room temperature and cast onto an untreated biaxially oriented polyester film. Two films were cast with 6 inch Gardiner blades, one with a 10 mil blade gap and a second with a 20 mil blade gap. The drawdown thicknesses of the two resulting films are referred to as "10 mils" and "20 mils", respectively, and the two films as the "10 mil film" and the "20 mil film", respectively. The two cast films were dried overnight at room temperature and ambient humidity, then heated in an oven at 75° C. for 30 min before testing for solar control properties. Where noted, some films were also heated on a hot plate at 70° C. to 90° C. for 5 or 10 min before or after being heated in the oven.

Standard Transfer Printing Procedure

The coated surface of a coated polyester film prepared according to the standard procedure described above was contacted with a surface of a Butacite® polyvinyl butyral sheet (2.5 inches by 6 inches (6.4 cm by 15.2 cm) by 30 mils (0.76 mm) thick (available from DuPont)). An iron preheated to 100° C. was placed on the uncoated surface of the polyester film and pressure was applied by hand. After 1 minute, the iron was removed and the polyester release film was stripped away to provide a Butacite® sheet that is coated with the layer containing the phthalocyanine compound.

Standard Procedure for Lamination

A pre-press assembly, in which all the layers in the laminate are cut to the same size and stacked in the desired order, is placed into a vacuum bag and heated at 90° C. to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas so that the pressure in the autoclave is allowed to decrease. After 20 minutes of cooling, when the air temperature is less than about 50° C., the excess pressure is vented and the laminate is removed from the autoclave.

Standard Procedure for Preparing Plaques

First, two standard solutions were prepared. Solution I contained 92.8 wt % of the plasticizer triethylene glycol bis(2-ethyl hexanoate), 3 wt % of Tinuvin™ 571, 3 wt % of Tinuvin™ 123, and 1.2 wt % of octylphenol. Solution II contained 88.5 wt % of water, 5.3 wt % of potassium acetate, and 6.2 wt % of magnesium acetate. Next, polyvinyl butyral (144.2 g) was mixed with the plasticizer triethylene glycol bis(2-ethyl hexanoate) (15.8 g+/−0.1 g), an aliquot of Solution I (40.0 g), and an aliquot of Solution II (1.25 mL). When a phthalocyanine compound was included in the plaque, it was added as a 1 wt % solution in the plasticizer, and the total amount of neat plasticizer and phthalocyanine solution was held at 15.8 g+/−0.1 g.

The polyvinyl butyral mixture was fed to a Brabender extruder (extruder head 25:1 L/d single screw, screw diameter 0.75 inch, screw speed 40 rpm). The temperature profile was: feed zone, 110° C.; Section 1, 190° C.; Section 2, 190° C.; and die plate, 190° C. The resulting compounded blend was collected, cooled, then pressed into plaques measuring 3 inch by 3 inch by 30 mils (76 mm×76 mm×0.75 mm) and 2.5 inch by 6 inch by 30 mils (63 mm×152 mm×0.75 mm). The melt press cycle included a 3 minute heat up step at a pressure of 6000 psi, a 2 minute hold at 12,000 psi and a 4 minute cool down at 12,000 psi, with a maximum press temperature of 180° C.

Solar Control Properties of Films

Solar and visible transmittance values were calculated on simulated laminates using the following methods. Transmission spectra were obtained on phthalocyanine- or naphthalocyanine-containing layers supported on a polyethylene terephthalate film using a Varian Cary 5000 uv/vis/nir spectrometer. A resulting spectrum was processed to compensate for the reflectance from the front and rear surfaces due to refractive index mismatch with air thereby simulating the transmission spectrum of the film as it would appear if the film were embedded between two layers of material with a refractive index that was matched to the sample. The compensated spectrum was then entered as an interlayer material into Lawrence Berkeley National Laboratory's Optics software package version 5.1 (Maintenance Pack 2) equipped with International Glazing Database No. 14.0.

Simulation Method A

In Method A, laminates were simulated using (from the outboard lite to the inboard lite) a generic 6 mm thick clear glass (clear__6.dat), the compensated interlayer data produced above, a 15 mil thick layer of Butacite® NC010 (15PVB6.dup), and a 3 mm inboard lite of generic 3 mm thick clear glass (clear__3.dat). In the subsequent examples, when it is stated that the spectral data is "multiplied" by a given factor, this indicates that simulated laminates were made using more than one of the phthalocyanine- or naphthalocyanine-containing layers in series. The software then simulated the transmission and reflection spectra for the simulated laminate using method W5_NFRC__2003 and calculated the visible ($T_{vis\text{-}sim}$) and solar ($T_{sol\text{-}sim}$) transmittances. The spectral data for the simulated laminates were saved and subsequently imported into Lawrence Berkeley National Laboratory's Window 5.2 Software version 5.2.12. The calculated $T_{vis\text{-}sim}$ and $T_{sol\text{-}sim}$ for films are tabulated in Table 1.

Simulation Method B

Method B is identical to Method A, except that the simulated laminate does not include the generic 6 mm thick clear glass (clear__6.dat). The calculated $T_{vis\text{-}sim}$ and $T_{sol\text{-}sim}$ for films are tabulated in Table 1.

Solar Control Properties of Laminates

Spectra were obtained according to the procedures of ASTM test methods E424 and E308, and ISO test methods 9050:2003 and 13837 using a Perkin Elmer Lambda 19 Spectrophotometer (PerkinElmer, Inc., Wellesley, Mass.). These measurements were used directly, as described immediately above, to calculate simulated transmittances. The calculated $T_{vis\text{-}sim}$ and $T_{sol\text{-}sim}$ for laminates are tabulated in Table 2.

Comparative Experiment CE1

Coated polyester films were prepared according to the standard procedure using a standard solution of aluminum phthalocyanine hydroxide, (0.0020 g, hydroxy(29H,31H-phthalocyaninato)aluminum, CAS 18155-23-2, dye content about 85%).

Comparative Experiment CE2

Coated polyester films were prepared according to the standard procedure using a standard solution of nickel(II) phthalocyanine tetrasulfonic acid, tetrasodium salt, (0.0021 g, CAS 27835-99-0).

Comparative Experiment CE3

Coated polyester films were prepared according to the standard procedure using a standard solution of gallium(III) phthalocyanine hydroxide, (0.0021 g, CAS 63371-84-6, dye content about 75%).

Comparative Experiment CE4

Coated polyester films were prepared according to the standard procedure using a standard solution of gallium(III)

phthalocyanine hydroxide, (0.0080 g, CAS 63371-84-6, dye content about 75%). Dichloromethane (4.00 g) was used in place of methanol.

Comparative Experiment CE5

Coated polyester films were prepared according to the standard procedure using a standard solution of zinc phthalocyanine, (0.0020 g, CAS 14320-04-8, dye content about 97%). The 10 mil film was dried at room temperature overnight, at 90° C. on a hot plate for 5 min, and then heated to 75° C. in an oven for 0.50 hour. The 20 mil film was dried at room temperature overnight, heated to 75° C. in an oven for 0.50 hour and then heated at 80° C. on a hot plate for 10 min.

Comparative Experiment CE6

Coated polyester films were prepared according to the standard procedure using a standard solution of a deagglomerated concentrate of Green Pigment 7 in Mowital™ B30T polyvinyl butyral, (0.0050 g, 40 wt % Green Pigment 7, based on total weight of concentrate). The 20 mil film was allowed to dry at room temperature overnight, heated to 75° C. in an oven overnight, and then heated to 80° C. for 10 min.

Comparative Experiment CE7

Coated polyester films were prepared according to the standard procedure using a standard solution of a deagglomerated concentrate of Blue Pigment 15:4 in Mowital™ B30T polyvinyl butyral, (0.0050 g, 40 wt % Blue Pigment 15:4, based on total weight of concentrate).

Comparative Experiment CE8

Coated polyester films were prepared according to the standard procedure using a standard solution of tetrakis(4-cumylphenoxy) phthalocyanine, (0.0080 g, CAS 83484-76-8). Dichloromethane (4.02 g) was used in place of methanol.

Comparative Experiment CE9

Coated polyester films were prepared according to the standard procedure using a standard solution of manganese (II) phthalocyanine, (0.0202 g, CAS 14325-24-7).

Comparative Experiment CE10

Coated polyester films were prepared according to the standard procedure using a standard solution of manganese (II) phthalocyanine, (0.0081 g, CAS 14325-24-7). Dichloromethane (4.04 g) was used in place of methanol.

Comparative Experiment CE11

Coated polyester films were prepared according to the standard procedure using a standard solution of manganese (III) phthalocyanine chloride, (0.0080 g, CAS 53432-32-9).

Comparative Experiment CE12

Coated polyester films were prepared according to the standard procedure using a standard solution of aluminum phthalocyanine chloride, (0.0161 g, CAS 14154-42-8).

Comparative Experiment CE13

Coated polyester films were prepared according to the standard procedure using a standard solution of aluminum phthalocyanine chloride, (0.0081 g, CAS 14154-42-8). Dichloromethane (4.03 g) was used in place of methanol.

Comparative Experiment CE14

Coated polyester films were prepared according to the standard procedure using a standard solution of Pro-jet™ 800 W, (0.0081 g, Avecia, Inc., Wilmington, Del.).

Comparative Experiment CE15

Coated polyester films were prepared according to the standard procedure using a standard solution of Pro-jet™ 800 NP, (0.0081 g, Avecia, Inc., Wilmington, Del.).

Comparative Experiment CE16

Coated polyester films were prepared according to the standard procedure using a standard solution of Excolor™ IR-10A, (0.0080 g, Nippon Shokubai Company, Osaka, Japan).

Comparative Experiment CE17

Coated polyester films were prepared according to the standard procedure using a standard solution of Excolor™ IR-12, (0.0081 g, Nippon Shokubai Company, Osaka, Japan).

Comparative Experiment CE18

Coated polyester films were prepared according to the standard procedure using a standard solution of Excolor™ IR-14, (0.0081 g, Nippon Shokubai Company, Osaka, Japan).

Comparative Experiment CE19

Coated polyester films were prepared according to the standard procedure using a standard solution of Excolor™ TX-EX-906B, (0.0082 g, Nippon Shokubai Company, Osaka, Japan).

Comparative Experiment CE20

Coated polyester films were prepared according to the standard procedure using a standard solution of Excolor™ TX-EX-910B, (0.0080 g, Nippon Shokubai Company, Osaka, Japan).

Example E1

Coated polyester films were prepared according to the standard procedure using a standard solution of OPM-868 (0.0081 g, Toyo Ink Manufacturing Company, Tokyo, Japan).

Example E2

A solution of OPM-868 (0.0160 g, Toyo Ink Manufacturing Company, Tokyo, Japan) was prepared by adding the OPM-868 to an aliquot of standard stabilizing solution (16.0893 g). After the OPM-868 was dissolved, polyvinyl butyral (3.9823 g, Mowital™ B30T) was added and the mixture was stirred at room temperature until the polyvinyl butyral was dissolved.

Coated polyester films were prepared according to the standard procedure using the OPM-868 solution.

Example E3

Coated polyester films were prepared according to the standard procedure using a standard solution of OPM-249 (0.0080 g, Toyo Ink Manufacturing Company, Tokyo, Japan).

Example E4

A solution of OPM-249 (0.0161 g, Toyo Ink Manufacturing Company, Tokyo, Japan) was prepared by adding the OPM-868 to an aliquot of standard stabilizing solution (16.0900 g). After the OPM-249 was dissolved, polyvinyl butyral (3.9857 g, Mowital™ B30T) was added and the mixture was stirred at room temperature until the polyvinyl butyral was dissolved.

Coated polyester films were prepared according to the standard procedure using the OPM-249 solution.

Comparative Experiment CE21

Coated polyester films were prepared according to the standard procedure using a standard solution of YKR-3080 (0.0081 g, Yamamoto Chemicals, Inc., Osaka, Japan).

Comparative Experiment CE22

Coated polyester films were prepared according to the standard procedure using a standard solution of YKR-3080 (0.0081 g, Yamamoto Chemicals, Inc., Osaka, Japan). Dichloromethane (4.03 g) was used in place of methanol.

Example E5

Coated polyester films were prepared according to the standard procedure using a standard solution of YKR-3020 (0.0079 g, Yamamoto Chemicals, Inc., Osaka, Japan).

Example E6

Coated polyester films were prepared according to the standard procedure using a standard solution of YKR-3020 (0.0081 g, Yamamoto Chemicals, Inc., Osaka, Japan.). Dichloromethane (4.03 g) was used in place of methanol.

Comparative Experiment CE23

A Butacite® sheet was conditioned overnight at 23% relative humidity a temperature of 72° F. A glass/conditioned Butacite® sheet/glass pre-press assembly consisting of, in order, a clear annealed float glass plate layer, the conditioned Butacite® sheet layer and a second clear annealed float glass plate layer (each layer measuring 6 inches by 2.5 inches (15.2 cm by 6.4 cm); glass layers 2.5 mm thick; Butacite® sheet 30 mils (0.75 mm) thick) was laminated according to the standard lamination procedure.

Example E7

Coated polyester films were prepared according to the standard procedure, using a standard solution of 1,4,8,11,15,18,22,25-octabutoxy-29H,31H-phthalocyanine, (0.0060 grams, CAS 116453-73-7).

Example E8

The coated 10 mil film of Example E7 was transfer printed onto a Butacite® polyvinyl butyral sheet according to the standard transfer printing procedure.

The transfer-printed Butacite® sheet was conditioned overnight at a temperature of 72° F. and 23% relative humidity. A glass/conditioned transfer-printed Butacite® sheet/glass pre-press assembly consisting of, in order, a clear annealed float glass plate layer, the conditioned transfer-printed Butacite® sheet layer and a second clear annealed float glass plate layer (each layer measuring 6 inches by 2.5 inches (15.2 cm by 6.4 cm); glass layers 2.5 mm thick; Butacite® sheet 30 mils (0.75 mm) thick) was laminated according to the standard lamination procedure.

Example E9

The coated 20 mil film of Example E7 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Example E10

A solution of 1,4,8,11,15,18,22,25-octabutoxy-29H,31H-phthalocyanine, (0.0060 grams, CAS 116453-73-7) was prepared by adding the phthalocyanine compound to an aliquot of standard stabilizing solution (16.0888 g). After the phthalocyanine compound was dissolved, polyvinyl butyral (3.9036 g, Mowital™ B30T) was added and the mixture was stirred at room temperature until the polyvinyl butyral was dissolved.

Coated polyester films were prepared according to the standard procedure using the phthalocyanine solution.

Example E11

The coated 20 mil film of Example E10 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Example E12

Coated polyester films were prepared according to the standard procedure using a standard solution of copper(II) 1,4,8,11,15,18,22,25-octabutoxy-29H,31H-phthalocyanine, (0.0080 grams, CAS 107227-88-3).

Example E13

The coated 10 mil film of Example E12 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Example E14

The coated 20 mil film of Example E12 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Example E15

A solution of copper(II) 1,4,8,11,15,18,22,25-octabutoxy-29H,31H-phthalocyanine (0.0080 grams, CAS 107227-88-3) was prepared by adding the phthalocyanine compound to an aliquot of standard stabilizing solution (16.0888 g). After the phthalocyanine compound was dissolved, polyvinyl butyral (3.9877 g, Mowital™ B30T) was added and the mixture was stirred at room temperature until the polyvinyl butyral was dissolved.

Coated polyester films were prepared according to the standard procedure using the phthalocyanine solution.

Example E16

The coated 20 mil film of Example E15 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Comparative Experiment CE24

Two Butacite® sheets were conditioned overnight at a temperature of 72° F. and 23% relative humidity. A glass/conditioned Butacite® sheet/conditioned Butacite® sheet/glass pre-press assembly consisting of, in order, a clear annealed float glass plate layer, the first conditioned Butacite® sheet layer, the second conditioned Butacite® sheet layer and a second clear annealed float glass plate layer (each layer measuring 6 inches by 2.5 inches (15.2 cm by 6.4 cm)); glass layers 2.5 mm thick; Butacite® sheets 15 mils (0.38 mm) thick) was laminated according to the standard lamination procedure.

Example E17

The coated 10 mil film of Example E10 was transfer printed onto two Butacite® polyvinyl butyral sheet according to the standard transfer printing procedure. The transfer-printed Butacite® sheets were conditioned as described in Comparative Experiment CE24 and used to prepare a glass/conditioned transfer-printed Butacite® sheet/conditioned transfer-printed Butacite® sheet/glass laminate using the procedure described in Comparative Experiment CE24. The coated surfaces of the transfer-printed Butacite® sheets were in contact with each other.

Example E18

Coated polyester films were prepared according to the standard procedure using a standard solution of copper(II) 1,4,8,11,15,18,22,25-octabutoxy-29H,31H-phthalocyanine, (0.0020 g, CAS 107227-88-3).

Example E19

The coated 20 mil film of Example E18 was transfer printed onto two Butacite® polyvinyl butyral sheets according to the standard transfer printing procedure. The transfer-printed Butacite® sheets were conditioned as described in Comparative Experiment CE24 and used to prepare a glass/conditioned transfer-printed Butacite® sheet/conditioned transfer-printed Butacite® sheet/glass laminate using the procedure described in Comparative Experiment CE24. The coated surfaces of the transfer-printed Butacite® sheets were in contact with each other.

Example E20

Coated polyester films were prepared according to the standard procedure using a standard solution of nickel(II) 1,4,8,11,15,18,22,25-octabutoxy-29H,31H-phthalocyanine, (0.0020 grams, CAS 155773-71-0). The resulting films were dried at room temperature overnight, heated to 90° C. for 10 min on a hot plate, and then heated at 75° C. in an oven for 0.5 hour.

Example E21

The coated 20 mil film of Example E20 was transfer printed onto two Butacite® polyvinyl butyral sheets according to the standard transfer printing procedure. The transfer-printed Butacite® sheets were conditioned as described in Comparative Experiment CE24 and used to prepare a glass/conditioned transfer-printed Butacite® sheet/conditioned transfer-printed Butacite® sheet/glass laminate using the procedure described in Comparative Experiment CE24. The coated surfaces of the transfer-printed Butacite® sheets were in contact with each other.

Example E22

A solution of nickel(II) 1,4,8,11,15,18,22,25-octabutoxy-29H,31H-phthalocyanine (0.0080 grams, CAS 155773-71-0) was prepared by adding the phthalocyanine compound to an aliquot of standard stabilizing solution (16.0090 g). After the phthalocyanine compound was dissolved, polyvinyl butyral (3.9025 g, Mowital™ B30T) was added and the mixture was stirred at room temperature until the polyvinyl butyral was dissolved.

Coated polyester films were prepared according to the standard procedure using the phthalocyanine solution.

Example E23

The coated 20 mil film of Example E22 was transfer printed onto two Butacite® polyvinyl butyral sheets according to the standard transfer printing procedure. The transfer-printed Butacite® sheets were conditioned as described in Comparative Experiment CE24 and used to prepare a glass/conditioned transfer-printed Butacite® sheet/conditioned transfer-printed Butacite® sheet/glass laminate using the procedure described in Comparative Experiment CE24. The coated surfaces of the transfer-printed Butacite® sheets were in contact with each other.

Comparative Experiment CE25

A Butacite® sheet and an uncoated biaxially oriented poly(ethylene terephthalate) film were conditioned overnight at 23% relative humidity and at a temperature of 72° F. A glass/conditioned Butacite® sheet/conditioned biaxially oriented poly(ethylene terephthalate) film/Teflon® film/glass pre-press assembly consisting of, in order, a clear annealed float glass plate layer, the conditioned Butacite® sheet layer, the conditioned uncoated poly(ethylene terephthalate) film, a Teflon® film, and a second clear annealed float glass plate layer (each layer measuring 3 inches by 3 inches (7.6 cm by 7.6 cm); glass layers 3 mm thick; Butacite® sheet 30 mils (75 mm) thick) was laminated according to the standard lamination procedure. Removal of the Teflon® film and the second glass layer provided a glass/conditioned Butacite®/conditioned biaxially oriented poly(ethylene terephthalate) film laminate.

Example E24

The coated 10 mil film of Example E18 was transfer printed onto a Butacite® polyvinyl butyral sheet according to the standard transfer printing procedure. The transfer-printed Butacite® sheet and an uncoated biaxially oriented poly(ethylene terephthalate) film were conditioned as described in Comparative Experiment CE25 and used to prepare a glass/conditioned transfer-printed Butacite® sheet/conditioned biaxially oriented poly(ethylene terephthalate) film laminate using the procedure described in Comparative Experiment CE25.

Example E25

The coated 10 mil film of Example E22 was transfer printed onto a Butacite® polyvinyl butyral sheet according to the standard transfer printing procedure. The transfer-printed Butacite® sheet and an uncoated biaxially oriented poly(ethylene terephthalate) film were conditioned as described in Comparative Experiment CE25 and used to prepare a glass/conditioned transfer-printed Butacite® sheet/conditioned biaxially oriented poly(ethylene terephthalate) film laminate using the procedure described in Comparative Experiment CE25.

Comparative Experiment CE26

A Butacite® sheet and an uncoated biaxially oriented poly (ethylene terephthalate) film were conditioned as described in Comparative Experiment CE25 and used to prepare a green glass/conditioned Butacite®/conditioned biaxially oriented poly(ethylene terephthalate) film laminate using the procedure described in Comparative Experiment CE25. The only difference was that a Solex™ green glass plate was used in place of the first clear annealed float glass plate.

Example E26

The coated 10 mil film of Example E20 was transfer printed onto a Butacite® polyvinyl butyral sheet according to the standard transfer printing procedure. The transfer-printed Butacite® sheet and an uncoated biaxially oriented poly(ethylene terephthalate) film were conditioned as described in Comparative Experiment CE26 and used to prepare a green glass/conditioned transfer-printed Butacite® sheet/conditioned biaxially oriented poly(ethylene terephthalate) film laminate using the procedure described in Comparative Experiment CE26.

Example E27

A solution of 1,4,8,11,15,18,22,25-octabutoxy-29H,31H-phthalocyanine (0.0020 g, CAS 116453-73-7) was prepared by adding the phthalocyanine compound to triethylene glycol bis(2-ethyl hexanoate) plasticizer, (1.5002 g, CAS 94-28-0). The mixture was stirred at room temperature. The phthalocyanine compound was soluble and formed a green solution.

Example E28

A solution of copper(II) 1,4,8,11,15,18,22,25-octabutoxy-29H,31H-phthalocyanine (0.0020 g, CAS 107227-88-3) was prepared by adding the phthalocyanine compound to triethylene glycol bis(2-ethyl hexanoate) plasticizer, (1.5044 g, CAS 94-28-0). The mixture was stirred at room temperature. The phthalocyanine compound was soluble and formed a green solution.

Example E29

A solution of nickel(II) 1,4,8,11,15,18,22,25-octabutoxy-29H,31H-phthalocyanine (0.0021 g, CAS 155773-71-0) was prepared by adding the phthalocyanine compound to triethylene glycol bis(2-ethyl hexanoate) plasticizer, (1.5041 g, CAS 94-28-0). The mixture was stirred at room temperature. The phthalocyanine compound was soluble and formed a green solution.

Comparative Experiment CE27

Control plaques that included no phthalocyanine compound were prepared according to the standard procedure for preparing plaques.

Example E30

Plaques were prepared according to the standard procedure for preparing plaques using 3.0 g of a 1 wt % solution of 1,4,8,11,15,18,22,25-octabutoxy-29H,31H-phthalocyanine (CAS 116453-73-7) in plasticizer in place of 3.0 g of neat plasticizer.

Example E31

Plaques were prepared according to the standard procedure for preparing plaques using 5.0 g of a 1 wt % solution of 1,4,8,11,15,18,22,25-octabutoxy-29H,31H-phthalocyanine, (CAS 116453-73-7; 5.0 g of a 1 wt % solution in plasticizer in place of 5.0 g of neat plasticizer.

Comparative Experiment CE28

A 3 inch by 3 inch by 30 mils (7.6 cm×7.6 cm×0.75 mm) plaque prepared in Comparative Experiment CE27 was conditioned overnight at a temperature of 72° F. and 23% relative humidity. A glass/conditioned polyvinyl butyral plaque/glass pre-press assembly consisting of, in order, a clear annealed float glass plate layer, the conditioned polyvinyl butyral plaque layer and a second clear annealed float glass plate layer (each layer measuring 3 inches by 3 inches (7.6 cm by 7.6 cm); glass layers 2.3 mm thick); was laminated according to the standard lamination procedure.

Example E32

A 3 inch by 3 inch by 30 mils (7.6 cm×7.6 cm×0.75 mm) plaque prepared in Example E30 was conditioned as described in Comparative Experiment CE28 and used to prepare a glass/conditioned polyvinyl butyral plaque/glass laminate using the procedure described in Comparative Experiment CE28.

Example E33

A 3 inch by 3 inch by 30 mils (7.6 cm×7.6 cm×0.75 mm) plaque prepared in Example E31 was conditioned as described in Comparative Experiment CE28 and used to prepare a glass/conditioned polyvinyl butyral plaque/glass laminate using the procedure described in Comparative Experiment CE28.

Comparative Experiment CE29

The glass/conditioned polyvinyl butyral plaque/glass laminate of Comparative Experiment CE28 was reproduced except that the plaque used and the glass layers all measured 2.5 in by 6 in (63 mm×152 mm).

Comparative Experiment CE30

The glass/conditioned polyvinyl butyral plaque/glass laminate of Comparative Experiment CE29 was reproduced.

Comparative Experiment CE31

The glass/conditioned polyvinyl butyral plaque/glass laminate of Comparative Experiments CE29 and CE30 was reproduced.

Example E34

The glass/conditioned polyvinyl butyral plaque/glass laminate of Example E32 was reproduced except that the plaque used and the glass layers all measured 2.5 in by 6 in (6.3 cm×15.2 cm).

Example E35

The glass/conditioned polyvinyl butyral plaque/glass laminate of Example E34 was reproduced.

Example E36

The glass/conditioned polyvinyl butyral plaque/glass laminate of Examples E34 and E35 was reproduced.

Example E37

The glass/conditioned polyvinyl butyral plaque/glass laminate of Example E33 was reproduced except that the plaque used and the glass layers all measured 2.5 in by 6 in (6.3 cm×15.2 cm).

Example E38

The glass/conditioned polyvinyl butyral plaque/glass laminate of Example E37 was reproduced.

Example E39

The glass/conditioned polyvinyl butyral plaque/glass laminate of Examples E37 and E38 was reproduced.

Comparative Experiment CE32

Two 3 inch by 3 inch by 30 mils (7.6 cm×7.6 cm×0.75 mm) plaques prepared in Comparative Experiment CE27 were conditioned overnight at a temperature of 72° F. and 23% relative humidity. A glass/conditioned polyvinyl butyral plaque/conditioned polyvinyl butyral plaque/glass pre-press assembly consisting of, in order, a clear annealed float glass plate layer, the two conditioned polyvinyl butyral plaques and a second clear annealed float glass plate layer (each layer measuring 3 inches by 3 inches (7.6 cm×7.6 cm); glass layers 2.3 mm thick) was laminated according to the standard lamination procedure.

Example E40

Two 3 inch by 3 inch by 30 mils (7.6 cm×7.6 cm×0.75 mm) plaques prepared in Example E30 were conditioned as described in Comparative Experiment CE32 and used to prepare a glass/conditioned polyvinyl butyral plaque/conditioned polyvinyl butyral plaque/glass laminate using the procedure described in Comparative Experiment CE32.

Example E41

Two 3 inch by 3 inch by 30 mils (7.6 cm×7.6 cm×0.75 mm) plaques prepared in Example E31 were conditioned as described in Comparative Experiment CE32 and used to prepare a glass/conditioned polyvinyl butyral plaque/conditioned polyvinyl butyral plaque/glass laminate using the procedure described in Comparative Experiment CE32.

Comparative Experiment CE33

A 3 inch by 3 inch by 30 mils (7.6 cm×7.6 cm×0.75 mm) plaque of Comparative Experiment CE27 was conditioned overnight at a temperature of 72° F. and 23% relative humidity. was conditioned overnight at a temperature of 72° F. and 23% relative humidity. A green glass/conditioned polyvinyl butyral plaque/glass pre-press assembly consisting of, in order, a Solex™ green glass plate layer, the conditioned polyvinyl butyral plaque layer and a clear annealed float glass plate layer (each layer measuring 3 inches by 3 inches (7.6 cm by 7.6 cm); glass layers 2.3 mm thick); was laminated according to the standard lamination procedure.

Example E42

A 3 inch by 3 inch by 30 mils (7.6 cm×7.6 cm×0.75 mm) plaque prepared in Example E30 was conditioned as described in Comparative Experiment CE33 and used to prepare a green glass/conditioned polyvinyl butyral plaque/glass laminate using the procedure described in Comparative Experiment CE33.

Example E43

A 3 inch by 3 inch by 30 mils (7.6 cm×7.6 cm×0.75 mm) plaque prepared in Example E31 was conditioned as described in Comparative Experiment CE33 and used to prepare a green glass/conditioned polyvinyl butyral plaque/glass laminate using the procedure described in Comparative Experiment CE33.

Comparative Experiment CE34

A 3 inch by 3 inch by 30 mils (7.6 cm×7.6 cm×0.75 mm) plaque prepared in Comparative Example CE27 and an uncoated biaxially oriented poly(ethylene terephthalate) film were conditioned overnight at 23% relative humidity and at a temperature of 72° F. A glass/conditioned polyvinyl butyral plaque/conditioned biaxially oriented poly(ethylene terephthalate) film/Teflon® film/glass pre-press assembly consisting of, in order, a clear annealed float glass plate layer, the conditioned Butacite® sheet layer, the conditioned uncoated poly(ethylene terephthalate) film, a Teflon® film, and a second clear annealed float glass plate layer (each layer measuring 3 inches by 3 inches (7.6 cm by 7.6 cm); glass layers 3 mm thick) was laminated according to the standard lamination procedure. Removal of the Teflon® film and the second glass layer provided a glass/conditioned polyvinyl butyral plaque/conditioned biaxially oriented poly(ethylene terephthalate) film laminate.

Example E44

A 3 inch by 3 inch by 30 mils (7.6 cm×7.6 cm×0.75 mm) plaque prepared in Example E30 and an uncoated biaxially oriented poly(ethylene terephthalate) film were conditioned as described in Comparative Experiment CE34 and used to prepare a glass/conditioned polyvinyl butyral plaque/conditioned biaxially oriented poly(ethylene terephthalate) film laminate using the procedure described in Comparative Experiment CE34.

Example E45

A 3 inch by 3 inch by 30 mils (7.6 cm×7.6 cm×0.75 mm) plaque prepared in Example E31 and an uncoated biaxially oriented poly(ethylene terephthalate) film were conditioned as described in Comparative Experiment CE34 and used to prepare a glass/conditioned polyvinyl butyral plaque/conditioned biaxially oriented poly(ethylene terephthalate) film laminate using the procedure described in Comparative Experiment CE34.

Comparative Experiment CE35

A 3 inch by 3 inch by 30 mils (7.6 cm×7.6 cm×0.75 mm) plaque prepared in Comparative Example CE27 and an uncoated biaxially oriented poly(ethylene terephthalate) film were conditioned as described in Comparative Experiment CE34 and used to prepare a green glass/conditioned polyvinyl butyral plaque/conditioned biaxially oriented poly(ethylene terephthalate) film laminate using the procedure described in Comparative Experiment CE34. The only difference was that a Solex™ green glass plate was used in place of the first clear annealed float glass plate.

Example E46

A 3 inch by 3 inch by 30 mils (7.6 cm×7.6 cm×0.75 mm) plaque prepared in Example E30 and an uncoated biaxially oriented poly(ethylene terephthalate) film were conditioned as described in Comparative Experiment CE35 and used to prepare a green glass/conditioned polyvinyl butyral plaque/conditioned biaxially oriented poly(ethylene terephthalate) film laminate using the procedure described in Comparative Experiment CE35.

Example E47

A 3 inch by 3 inch by 30 mils (7.6 cm×7.6 cm×0.75 mm) plaque prepared in Example E31 and an uncoated biaxially oriented poly(ethylene terephthalate) film were conditioned as described in Comparative Experiment CE35 and used to prepare a green glass/conditioned polyvinyl butyral plaque/conditioned biaxially oriented poly(ethylene terephthalate) film laminate using the procedure described in Comparative Experiment CE35.

Example E48

The coated 10 mil film of Example E2 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Example E49

The laminate of Example E48 was reproduced.

Example E50

The coated 10 mil film of Example E2 was transfer printed onto a Butacite® polyvinyl butyral sheet according to the standard transfer printing procedure. The transfer-printed Butacite® sheet was conditioned as described in Example E8 and used to prepare a glass/conditioned transfer-printed Butacite® sheet/glass laminate using the procedure described in Example E8.

Example E51

The laminate of Example 50 was reproduced.

Example E52

The coated 20 mil film of Example E1 was transfer printed onto a 6 inch by 3 inch by 15 mils (15.2 cm by 7.6 cm by 0.38 mm) Butacite® polyvinyl butyral sheet according to the standard transfer printing procedure. A doubled layer was then produced by folding the transfer-printed sheet over on itself with the coated surfaces touching to form a 3 inch by 3 inch (7.6 cm by 7.6 cm) doubled Butacite® layer with a Butacite® sheet/coating/coating/Butacite® sheet structure.

The doubled Butacite® layer was conditioned overnight at a temperature of 72° F. and 23% relative humidity. A glass/conditioned doubled Butacite® layer/glass pre-press assembly consisting of a clear annealed float glass plate layer, the conditioned doubled Butacite® layer and a second clear annealed float glass plate layer (each layer measuring 3 inches by 3 inches (7.6 cm by 7.6 cm); glass layers 3 mm thick) was laminated according to the standard lamination procedure.

Example E53

The coated 20 mil film of Example E3 was transfer printed onto a 6 inch by 3 inch by 15 mils (15.2 cm by 7.6 cm by 0.38 mm) Butacite® polyvinyl butyral sheet according to the standard transfer printing procedure. A doubled layer was then produced by folding the transfer-printed sheet over on itself with the coated surfaces touching to form a 3 inch by 3 inch (7.6 cm×7.6 cm) doubled Butacite® layer with a Butacite® sheet/coating/coating/Butacite® sheet structure.

The doubled Butacite® layer was conditioned as described in Example E52 and used to prepare a glass/conditioned doubled Butacite® layer/glass laminate using the procedure described in Example E52.

Example E54

The coated 10 mil film of Example E1 was transfer printed onto a 6 inch by 3 inch by 15 mils (15.2 cm by 7.6 cm by 0.38 mm) Butacite® polyvinyl butyral sheet according to the standard transfer printing procedure. A doubled layer was then produced by folding the transfer-printed sheet over on itself with the coated surfaces touching to form a 3 inch by 3 inch (7.6 cm×7.6 cm) doubled Butacite® layer with a Butacite® sheet/coating/coating/Butacite® sheet structure.

The doubled Butacite® layer was conditioned as described in Example E52 and used to prepare a green glass/conditioned doubled Butacite® layer/glass laminate using the procedure described in Example E52. The only difference was that a Solex™ green glass plate was used in place of the first clear annealed float glass plate.

Example E55

The coated 10 mil film of Example E3 was transfer printed onto a 6 inch by 3 inch by 15 mils (15.2 cm by 7.6 cm by 0.38 mm) Butacite® polyvinyl butyral sheet according to the standard transfer printing procedure. A doubled layer was then produced by folding the transfer-printed sheet over on itself with the coated surfaces touching to form a 3 inch by 3 inch (7.6 cm×7.6 cm) doubled Butacite® layer with a Butacite® sheet/coating/coating/Butacite® sheet structure.

The doubled Butacite® layer was conditioned as described in Example E52 and used to prepare a green glass/conditioned doubled Butacite® layer/glass laminate using the procedure described in Example E52. The only difference was that a Solex™ green glass plate was used in place of the first clear annealed float glass plate.

Example E56

The coated 10 mil film of Example E6 was transfer printed onto a 4 inch by 4 inch by 30 mils (10.2 cm by 10.2 cm by 0.38 mm) Butacite® polyvinyl butyral sheet according to the standard transfer printing procedure.

The transfer printed Butacite® sheet was conditioned as described in Example E8 and use to prepare a glass/conditioned transfer-printed Butacite® sheet/glass laminate using the procedure described in Example E8. The only difference was that all layers are 4 inches by 4 inches (10.2 cm by 10.2 cm) and the glass layers are 3 mm thick.

Comparative Experiment CE36

Two Butacite® sheets and a biaxially-oriented poly(ethylene terephthalate) film were conditioned overnight at a temperature of 72° F. and 23% relative humidity. A glass/conditioned Butacite® sheet/conditioned biaxially-oriented poly(ethylene terephthalate) film/conditioned Butacite® sheet/glass pre-press assembly consisting of, in order, a clear annealed float glass plate layer, the first conditioned Butacite® sheet layer, the conditioned biaxially-oriented poly(ethylene terephthalate) film, the second conditioned Butacite® sheet layer and a second clear annealed float glass plate layer (each layer measuring 6 inches by 2.5 inches (15.2 cm by 6.4 cm); glass layers 2.5 mm thick; Butacite® sheets 15 mils (0.38 mm) thick) was laminated according to the standard lamination procedure.

Comparative Experiment CE37

A de-agglomerated concentrate of Blue Pigment 15:4 (0.061 grams, 40 wt % Blue Pigment 15:4, based on total composition) was dissolved in a mixture of N,N-dimethylformamide (18.01 grams) and methanol (6.00 grams) by mixing at room temperature. Mowital™ B30T polyvinyl butyral (5.9457 grams) was added with stirring until a solution was formed.

This solution and flame treated, biaxially-oriented polyester films were used to prepare coated biaxially-oriented polyester films according to the standard procedure.

Comparative Experiment CE38

Two Butacite® sheets and the 20 mil coated biaxially-oriented polyester film of Comparative Experiment CE37 were conditioned overnight at a temperature of 72° F. and 23% relative humidity. A glass/conditioned Butacite® sheet/conditioned coated biaxially-oriented polyester film/conditioned Butacite® sheet/glass pre-press assembly consisting of, in order, a clear annealed float glass plate layer, the first conditioned Butacite® sheet layer, the conditioned coated biaxially-oriented polyester film, the second conditioned Butacite® sheet layer and a second clear annealed float glass plate layer (each layer measuring 4 inches by 4 inches (10.2 cm by 10.2 cm); glass layers 2.5 mm thick; Butacite® sheets 15 mils (0.38 mm) thick) was laminated according to the standard lamination procedure.

Comparative Experiment CE39

The laminate of Comparative Example CE26 was reproduced.

Example E57

A Butacite® sheet and the coated polyester film of Example 2 (drawdown thickness 10 mils) were conditioned overnight at 23% relative humidity and at a temperature of 72° F. The Butacite® sheet and the coated polyester film were conditioned as described in Comparative Experiment CE26 and used to prepare a green glass/conditioned Butacite® sheet/conditioned coated polyester film laminate using the procedure described in Comparative Experiment CE26.

Example E58

A solution of 1,4,8,11,15,18,22,25-Octabutoxy-29H,31H-phthalocyanine, (0.0090 grams, CAS 116453-73-7) was prepared by adding the phthalocyanine compound to a mixture of N,N-dimethylformamide (18.01 grams) and methanol (6.00 grams) by mixing at room temperature. Mowital™ B30T polyvinyl butyral (5.9786 grams) was added with stirring until a solution was formed.

This solution and flame treated, biaxially-oriented poly(ethylene terephthalate) films were used to prepare coated biaxially-oriented poly(ethylene terephthalate) films according to the standard procedure. The coated films were dried at room temperature overnight before heating in an oven at 75° C. for 30 min.

Example E59

Two Butacite® sheets and the 10-mil coated biaxially-oriented poly(ethylene terephthalate) film of Example E58 were conditioned as described in Comparative Experiment CE38 and used to prepare a glass/conditioned Butacite® sheet/conditioned coated biaxially-oriented poly(ethylene terephthalate) film/conditioned Butacite® sheet/glass laminate using the procedure described in Comparative Experiment CE38.

Example E60

The laminate of Example E59 was reproduced, the only difference being that the 20-mil coated biaxially-oriented poly(ethylene terephthalate) film of Example E58 was used.

Example E61

A solution of 1,4,8,11,15,18,22,25-octabutoxy-29H,31H-phthalocyanine (0.0090 g, CAS 116453-73-7) and Mowital™ B30T in standard stabilizing solution (24.1328 g) was used to prepare coated polyester films according to the standard procedure. The polyester was flame treated and biaxially oriented. The films were allowed to dry overnight at room temperature before heating at 75° C. in an oven for 30 min.

Example E62

A Butacite® sheet and the 20 mil coated polyester film of Example E61 were conditioned as described in Comparative Experiment CE25 and used to prepare a glass/conditioned Butacite® sheet/conditioned coated polyester film laminate using the procedure described in Comparative Experiment CE25.

Example E63

A Butacite® sheet, a SentryGlas® Plus ethylene/methacrylic acid copolymer sheet (available from DuPont) and the coated 20 mil polyester film of Example E61 were conditioned overnight at a temperature of 72° F. and 23% relative humidity. A glass/conditioned Butacite® sheet/conditioned coated polyester film/conditioned SentryGlas® Plus sheet/glass pre-press assembly consisting of, in order, a clear annealed float glass plate layer, the conditioned Butacite® sheet layer, the conditioned coated polyester film, the conditioned SentryGlas® Plus sheet layer and a second clear annealed float glass plate layer (each layer measuring 2 inches by 4 inches (5.6 cm by 10.2 cm); glass layers 2.5 mm thick; Butacite® sheet and SentryGlas® Plus sheet 15 mils (0.38 mm) thick) was laminated according to the standard lamination procedure.

Example E64

Two Butacite® sheets and the coated 10 mil film of Example E15 were conditioned as described in Comparative Experiment CE38 and used to prepare a glass/conditioned Butacite® sheet/conditioned coated polyester film/conditioned Butacite® sheet/glass laminate using the procedure described in Comparative Experiment CE38. The only difference was that each layer measured 6 inches by 2.5 inches (15.2 cm by 6.4 cm).

Example E65

A mixture of 2,3-naphthalocyanine (0.0081 grams, CAS 23627-89-6, dye content ca. 95 percent) was prepared by adding the naphthalocyanine compound to dichloromethane (4.00 grams) and mixing at room temperature. N,N-dimethylformamide (12.00 grams) was added to the mixture. A small amount of insolubles were removed. To the resulting solution was added Mowital™ B30T polyvinyl butyral (3.9982 grams, Kuraray Corporation) and the resulting mixture was mixed until a solution was formed at room temperature.

Coated poly(ethylene terephthalate) films were prepared according to the standard procedure using the naphthalocyanine compound solution.

Example E66

The coated 10 mil film of Example E65 was transfer printed onto a Butacite® polyvinyl butyral sheet according to the standard transfer printing procedure. The only difference was that the Butacite® sheet was 2 inches by 2 inches (5.1 cm by 5.1 cm) by 15 mils (0.38 mm) thick.

The transfer-printed Butacite® sheet and a Butacite® sheet were conditioned overnight at a temperature of 72° F. and 23% relative humidity. A glass/conditioned transfer-printed Butacite® sheet/conditioned Butacite® sheet/glass pre-press assembly consisting of, in order, a clear annealed float glass plate layer, the conditioned transfer-printed Butacite® sheet layer, the conditioned Butacite® sheet layer (with the coated surface of the transfer-printed Butacite® sheet in contact with the surface of the Butacite® sheet) and a second clear annealed float glass plate layer (each layer measuring 2 inches by 2 inches (5.1 cm by 5.1 cm); glass layers 2.3 mm thick; Butacite® sheets 15 mils (0.38 mm) thick) was laminated according to the standard lamination procedure.

Example E67

Two Butacite® sheets and the coated 20 mil poly(ethylene terephthalate) film prepared in Example E65 were conditioned overnight at a temperature of 72° F. and 23% relative humidity. A glass/conditioned Butacite® sheet/conditioned coated poly(ethylene terephthalate) film/conditioned Butacite® sheet/glass pre-press assembly consisting of, in order, a clear annealed float glass plate layer, the first conditioned Butacite® sheet layer, the conditioned coated poly(ethylene terephthalate) film of Example E65, the second conditioned Butacite® sheet layer and a second clear annealed float glass plate layer (each layer measuring 2 inches by 2 inches (5.1 cm by 5.1 cm); glass layers 2.3 mm thick; Butacite® sheets 15 mils (0.38 mm) thick) was laminated according to the standard lamination procedure.

Example E68

A mixture of 2,3-naphthalocyanine (0.0080 grams, CAS 23627-89-6, dye content ca. 95 percent) was prepared by adding the naphthalocyanine compound to dichloromethane (4.02 grams) and mixing at room temperature. An aliquot (16.0955 grams) of the standard stabilizing solution was added to the mixture. A small amount of insolubles were removed. To the resulting mixture was added Mowital™ B30T polyvinyl butyral (3.9287 grams, Kuraray Corporation) and the resulting mixture was mixed until a solution was formed at room temperature.

Coated poly(ethylene terephthalate) films were prepared according to the standard procedure using the naphthalocyanine compound solution.

Example E69

The coated 10 mil film of Example E68 was transfer printed onto a Butacite® polyvinyl butyral sheet according to the standard transfer printing procedure, the only difference was that the Butacite® polyvinyl butyral sheet was (2 inches by 2 inches (5.1 cm by 5.1 cm). The transfer-printed Butacite® sheet was conditioned as described in Example E8 and used to prepare a glass/conditioned transfer-printed Butacite® sheet/glass laminate using the procedure described in Example E8. The only differences were that each layer measured 2 inches by 2 inches (5.1 cm by 5.1 cm) and the glass layers were 2.3 mm thick.

Example E70

A Butacite® sheet and the coated 20 mil poly(ethylene terephthalate) film of Example E68 were conditioned as described in Comparative Experiment CE25 and used to prepare a glass/conditioned Butacite® sheet/conditioned coated poly(ethylene terephthalate) film laminate using the procedure described in Comparative Experiment CE25. The coated side of the conditioned coated poly(ethylene terephthalate) film was in contact with the conditioned Butacite® sheet. The only differences were that each layer measured 2 inches by 2 inches (5.1 cm by 5.1 cm) and the glass layers were 2.3 mm thick.

Example E71

A solution of nickel(II) 5,9,14,18,23,27,32,36-octabutoxy-2,3-naphthalocyanine (0.0080 grams, CAS 155773-70-9, dye content ca. 98 percent) was prepared by adding the naphthalocyanine compound to dichloromethane (16.00 grams) and mixing at room temperature. To the resulting solution was added Mowital™ B30T polyvinyl butyral, (3.9929 grams, Kuraray Corporation) and dichloromethane (5.17 grams). 0.50 hour prior to film casting, an additional amount of dichloromethane (4.15 grams), was added to the solution and the resulting solution was mixed at room temperature until casting.
A 10 mil coated poly(ethylene terephthalate) film was prepared according to the standard procedure using the naphthalocyanine compound solution.

Example E72

The coated 10 mil film of Example E71 was transfer printed onto a Butacite® polyvinyl butyral sheet according to the standard transfer printing procedure. The transfer-printed Butacite® sheet and an uncoated poly(ethylene terephthalate) film were conditioned as described in Comparative Experiment CE25 and used to prepare a glass/conditioned transfer-printed Butacite® sheet/conditioned poly(ethylene terephthalate) film laminate using the procedure described in Comparative Experiment CE25. The only differences were that each layer measured 2 inches by 2 inches (5.1 cm by 5.1 cm) and the glass layers were 2.3 mm thick.

Example E73

A Butacite® sheet and the 10 mil coated poly(ethylene terephthalate) film prepared in Example E71 were conditioned as described in Comparative Experiment CE25 and used to prepare a green glass/conditioned Butacite®/biaxially oriented poly(ethylene terephthalate) film laminate using the procedure described in Comparative Experiment CE25. The coated side of the conditioned coated poly(ethylene terephthalate) film was in contact with the conditioned Butacite® sheet. The only differences were that a Solex™ green glass plate was used in place of the first clear annealed float glass plate, each layer measured 2 inches by 2 inches (5.1 cm by 5.1 cm) and the annealed float glass layer was 2.3 mm thick.

Example E74

A mixture of silicon 2,3-naphthalocyanine bis(trihexylsilyloxide), (0.0081 grams, CAS 92396-88-8) was prepared by adding the naphthalocyanine compound to a mixture of N,N-dimethylformamide (12.00 grams), and methanol (4.00 grams) and mixing at room temperature until dissolved. A small amount of insolubles were removed. To the resulting solution was added Mowital™ B30T polyvinyl butyral (3.9904 grams, Kuraray Corporation), and the resulting mixture was mixed until a solution was formed at room temperature.
Coated poly(ethylene terephthalate) films were prepared according to the standard procedure using the naphthalocyanine compound solution.

Example E75

A solution of silicon 2,3-naphthalocyanine bis(trihexylsilyloxide), (0.0080 grams, CAS 92396-88-8) was prepared by adding the naphthalocyanine compound to a dichloromethane (4.00 grams) and mixing at room temperature. N,N-dimethylformamide (12.01 grams) was added to this solution and mixed at room temperature. A small amount of insolubles were removed. To the resulting solution was added Mowital™ B30T polyvinyl butyral (3.9904 grams, Kuraray Corporation) and the resulting mixture was mixed until a solution was formed at room temperature.
Coated poly(ethylene terephthalate) films were prepared according to the standard procedure using the naphthalocyanine compound solution.

Example E76

A mixture of silicon 2,3-naphthalocyanine dioctyloxide, (0.0081 grams, CAS 92941-50-9) was prepared by adding the naphthalocyanine compound to a mixture of N,N-dimethylformamide (12.01 grams), and methanol (4.01 grams) and mixing at room temperature until dissolved. A small amount of insolubles were removed. To the resulting solution was added Mowital™ B30T polyvinyl butyral (3.9940 grams, Kuraray Corporation), and the resulting mixture was mixed until a solution was formed at room temperature.
Coated poly(ethylene terephthalate) films were prepared according to the standard procedure using the naphthalocyanine compound solution.

Example E77

A mixture of silicon 2,3-naphthalocyanine dioctyloxide, (0.0080 grams, CAS 92941-50-9) was prepared by adding the naphthalocyanine compound to dichloromethane (4.13 grams) and mixing at room temperature. N,N-dimethylformamide (12.02 grams) was added to the mixture and mixed at room temperature. A small amount of insolubles were removed. To the resulting solution was added Mowital™ B30T polyvinyl butyral (3.9976 grams, Kuraray Corporation), and the resulting mixture was mixed until a solution was formed at room temperature.
Coated poly(ethylene terephthalate) films were prepared according to the standard procedure using the naphthalocyanine compound solution.

TABLE 1

Film Data

| Sample No.* | Drawdown thickness, mils | Multiplier | Tvis | Tsol |
|---|---|---|---|---|
| CE1 | 10 | 1 | 0.745 | 0.578 |
| CE2 | 20 | 1 | 0.757 | 0.662 |
| CE3 | 10 | 4 | 0.755 | 0.585 |
| CE4 | 20 | 1 | 0.756 | 0.593 |
| CE5 | 10 | 2 | 0.767 | 0.594 |
| CE6 | 20 | 1 | 0.774 | 0.613 |
| CE7 | 10 | 1 | 0.750 | 0.613 |
| CE8 | 20 | 1 | 0.600 | 0.526 |
| CE9 | 20 | 1 | 0.743 | 0.592 |
| CE10 | 20 | 2 | 0.772 | 0.595 |
| CE11 | 20 | 2 | 0.757 | 0.575 |
| CE12 | 10 | 1 | 0.467 | 0.452 |
| CE13 | 10 | 1 | 0.674 | 0.516 |
| CE14 | 10 | 1 | 0.614 | 0.516 |
| CE15 | 10 | 1 | 0.757 | 0.562 |
| CE16 | 20 | 1 | 0.698 | 0.509 |
| CE17 | 20 | 1 | 0.640 | 0.478 |
| CE18 | 10 | 1 | 0.737 | 0.553 |
| CE19 | 10 | 1 | 0.714 | 0.543 |

TABLE 1-continued

Film Data

| Sample No.* | Drawdown thickness, mils | Multiplier | Tvis | Tsol |
|---|---|---|---|---|
| CE20 | 10 | 1 | 0.715 | 0.551 |
| E1 | 10 | 3 | 0.681 | 0.460 |
| E1(B) | 10 | 3 | 0.722 | 0.577 |
| E2 | 10 | 2 | 0.667 | 0.460 |
| E2(B) | 10 | 2 | 0.707 | 0.557 |
| E3 | 20 | 1 | 0.723 | 0.491 |
| E3(B) | 20 | 1 | 0.766 | 0.594 |
| E4 | 10 | 1 | 0.706 | 0.481 |
| E4(B) | 10 | 1 | 0.748 | 0.582 |
| CE21 | 20 | 2 | 0.686 | 0.503 |
| CE22 | 10 | 1 | 0.713 | 0.521 |
| E5 | 10 | 2 | 0.741 | 0.536 |
| E5(B) | 10 | 2 | 0.786 | 0.645 |
| E6 | 20 | 1 | 0.691 | 0.473 |
| E6(B) | 20 | 1 | 0.733 | 0.572 |
| E7 | 20 | 1 | 0.748 | 0.477 |
| E7(B) | 20 | 1 | 0.793 | 0.577 |
| E10 | 20 | 1 | 0.757 | 0.501 |
| E10(B) | 20 | 1 | 0.802 | 0.606 |
| E12 | 10 | 2 | 0.712 | 0.474 |
| E12(B) | 10 | 2 | 0.755 | 0.574 |
| E15 | 10 | 1 | 0.736 | 0.511 |
| E15(B) | 10 | 1 | 0.780 | 0.618 |
| E18 | 10 | 4 | 0.743 | 0.519 |
| E18(B) | 10 | 4 | 0.788 | 0.628 |
| E20 | 20 | 2 | 0.758 | 0.508 |
| E22 | 10 | 2 | 0.769 | 0.545 |
| E22(B) | 10 | 2 | 0.815 | 0.660 |
| CE37 | 10 | 1 | 0.477 | 0.603 |
| CE37 | 20 | 1 | 0.320 | 0.485 |
| E58 | 10 | 1 | 0.841 | 0.764 |
| E58(B) | 10 | 1 | 0.892 | 0.924 |
| E58 | 20 | 1 | 0.798 | 0.677 |
| E58(B) | 20 | 1 | 0.864 | 0.819 |
| E61 | 10 | 1 | 0.850 | 0.774 |
| E61(B) | 10 | 1 | 0.901 | 0.937 |
| E61 | 20 | 1 | 0.778 | 0.643 |
| E61(B) | 20 | 1 | 0.825 | 0.778 |
| E65 | 10 | 1 | 0.702 | 0.504 |
| E65(B) | 10 | 1 | 0.744 | 0.610 |
| E71 | 10 | 1 | 0.737 | 0.512 |
| E71 | 20 | 1 | 0.781 | 0.619 |
| E74 | 10 | 5 | 0.745 | 0.512 |
| E74 | 20 | 5 | 0.790 | 0.619 |
| E75 | 10 | 3 | 0.763 | 0.522 |
| E75 | 20 | 3 | 0.809 | 0.632 |
| E76 | 10 | 3 | 0.729 | 0.553 |
| E76 | 20 | 3 | 0.773 | 0.669 |
| E77 | 10 | 3 | 0.756 | 0.530 |
| E77 | 20 | 3 | 0.801 | 0.641 |

*Note:
Sample numbers without any notation designate films whose solar control properties were calculated according to Simulation Method A. Sample numbers including the notation "(B)" refer to films whose solar control properties were calculated according to Simulation Method B.

TABLE 2

Laminate Data

| Laminate Sample No. | Film Sample No.* | Tvis | Tsol |
|---|---|---|---|
| CE23 | | 0.877 | 0.751 |
| E8 | E7a | 0.833 | 0.637 |
| E9 | E7b | 0.796 | 0.577 |
| E11 | E10b | 0.811 | 0.603 |
| E13 | E12a | 0.818 | 0.631 |
| E14 | E12b | 0.789 | 0.588 |
| E16 | E15b | 0.775 | 0.577 |
| CE24 | | 0.873 | 0.747 |
| E17 | E10a | 0.805 | 0.592 |
| E19 | E18b | 0.828 | 0.642 |
| E21 | E20b | 0.823 | 0.621 |
| E23 | E22b | 0.813 | 0.608 |
| CE25 | | 0.886 | 0.815 |
| E24 | E18a | 0.877 | 0.777 |
| E25 | E22a | 0.870 | 0.755 |
| CE26 | | 0.820 | 0.593 |
| E26 | E20a | 0.802 | 0.554 |
| CE28 | CE27 | 0.856 | 0.738 |
| E32 | E30 | 0.801 | 0.624 |
| E33 | E31 | 0.774 | 0.587 |
| CE29 | CE27 | 0.852 | 0.738 |
| CE30 | CE27 | 0.860 | 0.744 |
| CE31 | CE27 | 0.860 | 0.742 |
| E34 | E30 | 0.801 | 0.630 |
| E35 | E30 | 0.803 | 0.631 |
| E36 | E30 | 0.812 | 0.637 |
| E37 | E31 | 0.785 | 0.597 |
| E38 | E31 | 0.783 | 0.594 |
| E39 | E31 | 0.781 | 0.595 |
| CE32 | CE27 | 0.833 | 0.711 |
| E40 | E30 | 0.747 | 0.560 |
| E41 | E31 | 0.702 | 0.513 |
| CE33 | CE27 | 0.816 | 0.611 |
| E42 | E30 | 0.767 | 0.506 |
| E43 | E31 | 0.742 | 0.481 |
| CE34 | CE27 | 0.859 | 0.799 |
| E44 | E30 | 0.815 | 0.688 |
| E45 | E31 | 0.775 | 0.630 |
| CE35 | CE27 | 0.795 | 0.581 |
| E46 | E30 | 0.772 | 0.548 |
| E47 | E31 | 0.731 | 0.494 |
| E48 | E2a | 0.797 | 0.603 |
| E49 | E2a | 0.802 | 0.604 |
| E50 | E4a | 0.760 | 0.575 |
| E51 | E4a | 0.748 | 0.565 |
| E52 | E1b | 0.697 | 0.419 |
| E53 | E3b | 0.628 | 0.491 |
| E54 | E1a | 0.740 | 0.437 |
| E55 | E3a | 0.749 | 0.475 |
| E56 | E6b | 0.732 | 0.541 |
| CE36 | | 0.860 | 0.743 |
| CE38 | CE37b | 0.291 | 0.372 |
| CE39 | | 0.832 | 0.596 |
| E57 | E2a | 0.740 | 0.462 |
| E59 | E58a | 0.802 | 0.600 |
| E60 | E58b | 0.776 | 0.565 |
| E62 | E61b | | |
| E63 | E61b | 0.755 | 0.535 |
| E64 | E15a | 0.797 | 0.609 |
| E66 | E65a | 0.754 | 0.581 |
| E67 | E65b | 0.674 | 0.485 |
| E69 | E68a | 0.796 | 0.624 |
| E70 | E68b | 0.697 | 0.549 |
| E72 | E71a | 0.804 | 0.644 |
| E73 | E71a | 0.748 | 0.525 |

*Note:
"a" refers to a film drawdown thickness of 10 mils; "b" refers to a film drawdown thickness of 20 mils.

Example 78

Polyvinyl butyral having a hydroxyl number of 18.95 (18.95% OH) was fed at a rate of 79.9 kg/hr into an 83 mm twin screw extruder operating with a temperature profile of Head: 187° C., Zone 1: 167° C., Zone 2: 172° C., Zone 3: 177° C., Zone 4: 182° C., Adapter: 192° C. A suspension of nickel (II) 1,4,8,11,15,18,22,25-octabutoxy-29H,31H-phthalocyanine (10.91 g, CAS No. 107227-88-3); 1,4-bis(isopropylamino) anthraquinone (1.36 g, CAS No. 14233-37-5); Tinuvin™ 571 (545 g); Tinuvin™ 123 (545 g), Irgastab™ FS 301 (545 g, from Ciba Specialty Chemicals), and 4-(1,1,3,3-tetramethylbutyl)phenol (218 g, commercially available from Schenectady International Group of Schenectady, N.Y.) in triethylene glycol bis(2-ethyl hexanoate) (29.2 kg, CAS No. 94-28-0) was injected into the polymer melt at a rate of 31 kg/hr. The resulting plasticized polymer was extruded through a sheeting die to form 30 mil (0.76 mm) thick sheeting.

The sheeting was laminated according to the standard procedure between two lites of float glass (2.5 inches by 6 inches (6.4 cm by 15.2 cm), thickness 2.3 mm) and the solar control properties of the laminate were measured according to the standard procedure. In addition, the laminate was subjected to weathering according to ASTM G90 Cycle 2 with no water spray. After a period equivalent to 1 year of natural weathering, the solar control properties of the laminate were re-measured. The results of these measurements are set forth in Table 3, below.

Example 79

Polyvinyl butyral of the same lot used in Example 78 was fed at 79.9 kg/hr into an 83 mm twin screw extruder operating with a temperature profile of Head: 187° C., Zone 1: 167° C., Zone 2: 172° C., Zone 3: 177° C., Zone 4: 182° C., Adapter: 192° C. A suspension of nickel(II) 1,4,8,11,15,18,22,25-octabutoxy-29H,31H-phthalocyanine (10.91 g), 1,4-bis(isopropylamino) anthraquinone (1.36 g), Tinuvin™ 571 (545 g), Tinuvin™ 123 (545 g), Tinuvin™ 326 (545 g), Irgastab™ FS 301 (545 g), and 4-(1,1,3,3-Tetramethylbutyl)phenol (218 g) in triethylene glycol bis(2-ethyl hexanoate) (29.2 kg) was injected into the polymer melt at 31.6 kg/hr. The resulting plasticized polymer was extruded through a sheeting die to form 30 mil (0.76 mm) thick sheeting.

The sheeting was laminated, according to the standard procedure, between two lites of float glass (2.5 inches by 6 inches (6.4 cm by 15.2 cm), thickness 2.3 mm) and the laminate's solar control properties were measured, according to the standard procedure. In addition, the laminate was subjected to weathering according to ASTM G90 Cycle 2 with no water spray. After a period equivalent to 1 year of natural weathering, the solar properties of the laminate were re-measured. The results of these measurements are set forth in Table 3, below.

Comparative Example CE78

Polyvinyl butyral of the same lot used in Example 78 was fed at 79.9 kg/hr into an 83 mm twin screw extruder operating with a temperature profile of Head: 187° C., Zone 1: 167° C., Zone 2: 172° C., Zone 3: 177° C., Zone 4: 182° C., Adapter: 192° C. A suspension of nickel(II) 1,4,8,11,15,18,22,25-octabutoxy-29H,31H-phthalocyanine (10.91 g), 1,4-bis(isopropylamino) anthraquinone (1.36 g), Tinuvin™ 123 (109.1 g), Tinuvin™ 326 (109.1 g), and 4-(1,1,3,3-tetramethylbutyl)phenol (218 g) in triethylene glycol bis(2-ethyl hexanoate) (29.2 kg) was injected into the polymer melt at 29.6 kg/hr. The resulting plasticized polymer was extruded through a sheeting die to form 30 mil (0.76 mm) thick sheeting.

The sheeting was laminated, according to the standard procedure, between two lites of float glass (2.5 inches by 6 inches (6.4 cm by 15.2 cm), thickness 2.3 mm) and the laminate's solar control properties were measured, according to the standard procedure. The laminate was subjected to weathering according to ASTM G90 Cycle 2 with no water spray. After a period equivalent to 1 year of natural weathering, the solar control properties of the laminate were re-measured. The results of these measurements are set forth in Table 3, below.

TABLE 3

| Weathering Data | | |
|---|---|---|
| Additive Package | $\Delta E^{*1}$ | $\Delta Tsol^2$ |
| Comparative Example CE78 | 4.97 | 2.88 |
| Example 78 | 2.78 | 0.98 |
| Example 79 | 2.16 | 0.33 |

Notes for Table 3:
[1] $\Delta E^* = ((\Delta L^*)^2 + (\Delta a^*)^2 + (\Delta b^*)^2)^{1/2}$;
[2] $\Delta Tsol = Tsol_{exposed} - Tsol_{nonexposed}$.

Examples E80 to E88 and Comparative Examples CE80 to CE85

Polyvinyl butyral (144.2 g) having a hydroxyl number of 18.95 (18.95% OH) was mixed with 53.4 grams of a plasticizer solution containing an IR-absorbing composition and a weathering package including the compounds listed in Table 4. The polyvinyl butyral mixture was fed to a Brabender extruder (extruder head 25:1 L/d single screw, screw diameter 0.75 inch, screw speed 40 rpm). The temperature profile was: feed zone, 110° C.; Section 1, 190° C.; Section 2, 190° C.; and die plate, 190° C. The resulting compounded blend was collected, cooled, then pressed into plaques measuring 2.5 inch by 6 inch by 30 mils (63 mm×152 mm×0.75 mm). The melt press cycle included a 3 minute heat up step at a pressure of 6000 psi, a 2 minute hold at 12,000 psi and a 4 minute cool down at 12,000 psi, with a maximum press temperature of 180° C.

The IR absorbing compositions were a naphthalocyanine-based IR absorbing composition (0.010 wt %; available under the trade name "YKR-3080" from Yamamoto Chemicals, Inc. of Osaka, Japan) and a phthalocyanine-based IR absorbing composition (a combination of nickel(II) 1,4,8,11,15,18,22,25-octabutoxy-29H,31H-phthalocyanine (0.010 wt %) and 1,4-bis(isopropylamino) anthraquinone (0.0029 wt %; CAS No. 14233-37-5, also known as "Solvent Blue 36")). The napthalocyanine-containing PVB compositions are referred to herein as the "A Series" and the letter A is appended to the relevant example number. The pthalocyanine-containing compositions are referred to herein as the "B Series" and the letter B is appended to the relevant example number. For example, Comparative Example CE80A included the "Standard Auto" weathering package and the YKR-3080 IR absorbing composition. Comparative Example CE80B included the "Standard Auto" weathering package and the phthalocyanine-based IR absorbing composition. The components of the weathering packages and the amounts of these additives, as weight percentages based on the total weight of the plasticized polymer composition, are set forth in Table 4, below. Tinuvin™ and Irgastab™ are trade names used by Ciba Specialty Chemicals.

TABLE 4

| | | Compositions | | | | | | | |
|---|---|---|---|---|---|---|---|---|---|
| Ex. No. | Formulation | % Tinuvin 571 | % Tinuvin 327 | % Tinuvin 328 | % Tinuvin P | % Tinuvin 123 | % Octylphenol | % Irgastab FS 301 | % Tinuvin 326 |
| CE80 | 326/123/octyl (Std Auto) | 0.00 | 0.00 | 0.00 | 0.00 | 0.1 | 0.2 | 0.00 | 0.1 |
| CE81 | 571/123/octyl (5x Std) | 0.5 | 0.00 | 0.00 | 0.00 | 0.5 | 0.1 | 0.00 | 0.00 |

TABLE 4-continued

| | | \multicolumn{8}{c}{Compositions} |
| Ex. No. | Formulation | % Tinuvin 571 | % Tinuvin 327 | % Tinuvin 328 | % Tinuvin P | % Tinuvin 123 | % Octylphenol | % Irgastab FS 301 | % Tinuvin 326 |
|---|---|---|---|---|---|---|---|---|---|
| CE82 | 571/123/301/octyl | 0.5 | 0.00 | 0.00 | 0.00 | 0.5 | 0.1 | 0.5 | 0.00 |
| E80 | 571/123/326/301/octyl | 0.5 | 0.00 | 0.00 | 0.00 | 0.5 | 0.1 | 0.5 | 0.5 |
| E81 | 2x571/123/301/octyl | 1.0 | 0.00 | 0.00 | 0.00 | 0.5 | 0.1 | 0.5 | 0.00 |
| E82 | 2x326/123/301/octyl | 0.00 | 0.00 | 0.00 | 0.00 | 0.5 | 0.1 | 0.5 | 1.0 |
| E83 | 571/123/327/301/octyl | 0.5 | 0.5 | 0.00 | 0.00 | 0.5 | 0.1 | 0.5 | 0.00 |
| E84 | 328/123/326/301/octyl | 0.00 | 0.00 | 0.5 | 0.00 | 0.5 | 0.1 | 0.5 | 0.5 |
| E85 | P/123/326/301/octyl | 0.00 | 0.00 | 0.00 | 0.5 | 0.5 | 0.1 | 0.5 | 0.5 |
| E86 | 571/123/326/301 | 0.5 | 0.00 | 0.00 | 0.00 | 0.5 | 0.00 | 0.5 | 0.5 |
| E87 | 571/123/326/octyl | 0.5 | 0.00 | 0.00 | 0.00 | 0.5 | 0.1 | 0.00 | 0.5 |
| CE83 | 326/123/octyl (Std Auto) | 0.00 | 0.00 | 0.00 | 0.00 | 0.1 | 0.2 | 0.00 | 0.1 |
| CE84 | 571/123/octyl (5x Std) | 0.5 | 0.00 | 0.00 | 0.00 | 0.5 | 0.1 | 0.00 | 0.00 |
| CE85 | (571/5)/(123/5)/octyl | 0.1 | 0.00 | 0.00 | 0.00 | 0.1 | 0.1 | 0.00 | 0.00 |
| E88 | 571/123/326/301/octyl | 0.5 | 0.00 | 0.00 | 0.00 | 0.5 | 0.1 | 0.5 | 0.5 |

The sheeting was laminated according to the standard procedure between two lites of float glass (2.5 inches by 6 inches (6.4 cm by 15.2 cm), thickness 2.3 mm) and the solar control properties of the laminate were measured according to the standard procedure. In addition, the laminate was subjected to weathering according to ASTM G90 Cycle 2 with no water spray. After a period equivalent to 1 year of natural weathering, the solar control properties of the laminate were re-measured. The results of these measurements are set forth in Table 5, below.

In Table 5, the columns labeled "YKR-3080 Difference 550-1150 nm" and "NiOBP Difference 525-850 nm" represent the summation, over the noted wavelengths, of the difference of the absorption spectrum before and after weathering. The columns labeled "Relative Degradation Rate" represent a ratio that is the comparison of two ratios. First, the ratio of the transmission of infrared light before weathering to the transmission after weathering was calculated for each laminate and expressed as a decimal number. This ratio was the degradation rate. Then, each degradation rate was divided by the smallest degradation rate to produce the relative degradation rate. In this scheme, a laminate having a relative degradation rate of 5 exhibits an increase in the amount of infrared light transmission that is 5 times greater than the increase exhibited by the best laminate in the series. It follows by logic that lower relative degradation rates result from superior weathering packages.

The data in Table 5 show that examples with weathering packages that include a phosphite processing stabilizer such as Irgastab™ FS 301 perform significantly better than the comparative examples.

Moreover, particularly in the B series, the data demonstrate an interaction between the phosphite processing stabilizer and the chlorine-containing benzotriazole light stabilizers Tinuvin™ 326 and 327. Addition of either component (CE82B, E81B, and E87B) to CE81B affords a slight benefit; however, addition of the combination components (E80B, E83B, E84B, and E85B) greatly increases the protective effect.

Also significantly, the relative degradation rates were not strictly proportional to the amount of material in the weathering package. If this were so, then CE80 and CE83 would have relative degradation rates that are five times greater than those of CE81 and CE84, respectively. (Tinuvin™ 571 is structurally similar to Tinuvin™ 326.) Likewise, CE85 would have a degradation rate that is about 5 times greater than that of CE83 and about 25 times greater than that of CE84.

This was clearly not the case, however. In the A series, the improvement between CE80 and CE81 was 3.3/2.6, or a factor of 1.3. In the B series, the improvement between CE80 and CE81 was 4.9/3.6, or a factor of 1.4. A repeated experiment (CE83B compared with CE84B and CE83B compared

TABLE 5

| | | \multicolumn{4}{c}{Relative Degradation Rates} |
| | | Napthalocyanine (A Series) | | Phthalocyanine (B Series) | |
| Ex. No. | Formulation | YKR-3080 Difference 550-1150 nm | Relative Degradation Rate | NiOBP Difference 525-850 nm | Relative Degradation Rate |
|---|---|---|---|---|---|
| CE80 | 326/123/octyl (Std Auto) | 32.3 | 3.3 | 49.4 | 4.9 |
| CE81 | 571/123/octyl (5x Std) | 25.0 | 2.6 | 36.1 | 3.6 |
| CE82 | 571/123/301/octyl | 22.3 | 2.3 | 22.1 | 2.2 |
| E80 | 571/123/326/301/octyl | 13.0 | 1.3 | 13.0 | 1.3 |
| E81 | 2x571/123/301/octyl | 13.9 | 1.4 | 16.0 | 1.6 |
| E82 | 2x326/123/301/octyl | 12.0 | 1.2 | 10.9 | 1.1 |
| E83 | 571/123/327/301/octyl | 13.7 | 1.4 | 10.5 | 1.0 |
| E84 | 328/123/326/301/octyl | 10.7 | 1.1 | 10.0 | 1.0 |
| E85 | P/123/326/301/octyl | 12.5 | 1.3 | 10.4 | 1.0 |
| E86 | 571/123/326/301 | 9.8 | 1.0 | 13.1 | 1.3 |
| E87 | 571/123/326/octyl | 12.0 | 1.2 | 21.7 | 2.2 |
| CE83 | 326/123/octyl (Std Auto) | | | 44.9 | 4.2 |
| CE84 | 571/123/octyl (5x Std) | | | 27.8 | 2.6 |
| CE85 | (571/5)/(123/5)/octyl | | | 47.4 | 4.4 |
| E88 | 571/123/326/301/octyl | | | 10.7 | 1.0 | with E88B) showed an improvement of a factor of 4.2 attained by the weathering package in E88B, when the amount of material in the weathering package was increased by a factor of five, the relative degradation rate was improved by 4.2/2.6, or a factor of 1.6.

In contrast, when the weathering packages described herein are used, the relative degradation rates are improved by a factor of 3.3 for formulations including a naphthalocyanine-based IR absorbing compound (A series). Similarly, the relative degradation rates are improved by a factor of 4.9 or 4.2 for formulations including a phthalocyanine-based IR absorbing compound (B series).

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A solar control composition comprising an infrared absorbing phthalocyanine compound or naphthalocyanine compound; a plasticized poly(vinyl butyral); and a weathering package comprising a phosphite processing stabilizer, a chlorine-containing benzotriazole light stabilizer, and, optionally, one or more other additives selected from the group consisting of dispersants, surfactants, chelating agents, coupling agents, processing aides, flow enhancing additives, lubricants, pigments, dyes, flame retardants, impact modifiers, nucleating agents to increase crystallinity, antiblocking agents such as silica, UV stabilizers, adhesives, primers, crosslinking agents, hardening agents, pH adjusting agents, antifoaming agents inorganic infrared absorbents, organic infrared absorbents, hindered amine light stabilizers, thermal stabilizers, UV absorbers, and wetting agents.

2. The solar control composition of claim 1, wherein the weathering package comprises one or more of the optional other additives selected from the group consisting of thermal stabilizer(s), UV absorber(s) and hindered amine light stabilizer(s).

3. A shaped article comprising the solar control composition of claim 1.

4. The shaped article of claim 3, wherein the shaped article is in the form of a coating, a film, a multilayer film, a sheet or a multilayer sheet.

5. A solar control laminate comprising the shaped article of claim 4.

6. The solar control laminate of claim 5, wherein the weathering package comprises one or more chlorine-containing benzotriazole light stabilizers.

7. The solar control laminate of claim 5, having a structure selected from the group consisting of polymeric film/solar control layer; polymeric sheet/solar control layer; rigid sheet/solar control layer; rigid sheet/polymeric sheet/solar control layer; first rigid sheet/polymeric sheet/solar control layer/additional polymeric sheet/second rigid sheet; rigid sheet/polymeric sheet/solar control layer/additional polymeric sheet/additional film; rigid sheet/additional polymeric sheet/additional film/polymeric sheet/solar control layer; rigid sheet/polymeric sheet/solar control layer/second polymeric sheet/additional film/third polymeric sheet/second rigid sheet; and first rigid sheet/polymeric sheet/solar control layer/additional polymeric sheet/second rigid sheet/second additional polymeric sheet/additional film/third additional polymeric sheet/third rigid sheet, wherein "/" indicates adjacent layers, wherein the solar control layer may be a film or a sheet, wherein the "second" layer of any film or sheet may be the same as or different from the first layer of that film or sheet, and wherein the "third" layer may be the same as or different from the first and second layers of that film or sheet.

8. The solar control composition of claim 1, wherein the weathering package comprises one or more chlorine-containing benzotriazole light stabilizers.

9. The solar control composition of claim 1, wherein the phthalocyanine compound or naphthalocyanine compound is an alkoxy-substituted phthalocyanine compound or naphthalocyanine compound.

10. The solar control composition of claim 1, wherein the phthalocyanine compound or naphthalocyanine compound is metallated with a metal ion selected from the group consisting of copper(II), nickel(II) and silicon(IV).

11. A solar control laminate comprising a solar control layer comprised of polyvinylbutyral; a concentration of an infrared absorbing phthalocyanine compound or naphthalocyanine compound; and a weathering package comprising a phosphite processing stabilizer, a chlorine-containing benzotriazole light stabilizer, and, optionally, one or more additives selected from the group consisting of dispersants, surfactants, chelating agents, coupling agents, processing aides, flow enhancing additives, lubricants, pigments, dyes, flame retardants, impact modifiers, nucleating agents to increase crystallinity, antiblocking agents such as silica, UV stabilizers, adhesives, primers, crosslinking agents, hardening agents, pH adjusting agents, antifoaming agents, inorganic infrared absorbents, organic infrared absorbents, hindered amine light stabilizers, thermal stabilizers, UV absorbers, and wetting agents; wherein said solar control laminate has a layer thickness, a level of transmission of solar light and a level of transmission of visible light such that when the laminate is simulated using Simulation Method A, the simulated level of transmittance of visible light, $T_{vis\text{-}sim}$, is $0.65<T_{vis\text{-}sim}<0.75$ and the simulated level of transmittance of solar light, $T_{sol\text{-}sim}$, for a phthalocyanine compound$<(0.932(T_{vis\text{-}sim})-0.146)$ and for a naphthalocyanine compound$<(0.481(T_{vis\text{-}sim})-0.166)$.

12. The solar control laminate of claim 11, wherein the weathering package comprises one or more of the optional other additives selected from the group consisting of thermal stabilizer(s), UV absorber(s) and hindered amine light stabilizer(s).

13. The solar control laminate of claim 11, wherein $T_{sol\text{-}sim}$ for a phthalocyanine compound$<(1.086(T_{vis\text{-}sim})-0.305)$.

14. The solar control laminate of claim 11, wherein the phthalocyanine compound or naphthalocyanine compound is an alkoxy-substituted phthalocyanine compound or naphthalocyanine compound.

15. The solar control laminate of claim 11, wherein the phthalocyanine compound or naphthalocyanine compound is metallated with a metal ion selected from the group consisting of copper(II), nickel(II) and silicon(IV).

16. The solar control laminate of claim 11, having a structure selected from the group consisting of polymeric film/solar control layer; polymeric sheet/solar control layer; rigid sheet/solar control layer; rigid sheet/polymeric sheet/solar control layer; first rigid sheet/polymeric sheet/solar control layer/additional polymeric sheet/second rigid sheet; rigid sheet/polymeric sheet/solar control layer/additional polymeric sheet/additional film; rigid sheet/additional polymeric sheet/additional film/polymeric sheet/solar control layer; rigid sheet/polymeric sheet/solar control layer/second polymeric sheet/additional film/third polymeric sheet/second rigid sheet; and first rigid sheet/polymeric sheet/solar control layer/additional polymeric sheet/second rigid sheet/second additional polymeric sheet/additional film/third additional polymeric sheet/third rigid sheet, wherein "/" indicates adjacent layers, wherein the solar control layer may be a film or a sheet, wherein the "second" layer of any film or sheet may be the same as or different from the first layer of that film or sheet, and wherein the "third" layer may be the same as or different from the first and second layers of that film or sheet.

17. The solar control laminate of claim 11, wherein the weathering package comprises one or more chlorine-containing benzotriazole light stabilizers.

18. A method of reducing the transmission of infrared radiation to the interior of a structure having an exterior window, said method comprising the steps of
  a. constructing a solar control laminate according to claim 11; and
  b. inserting the solar control laminate into the exterior window of the structure.

19. The method of claim 18, wherein the structure is a building or a vehicle.

* * * * *